(12) United States Patent
McAlister

(10) Patent No.: US 9,079,489 B2
(45) Date of Patent: Jul. 14, 2015

(54) METHODS FOR FUEL TANK RECYCLING AND NET HYDROGEN FUEL AND CARBON GOODS PRODUCTION ALONG WITH ASSOCIATED APPARATUS AND SYSTEMS

(71) Applicant: McAlister Technologies, LLC, Phoenix, AZ (US)

(72) Inventor: Roy Edward McAlister, Phoenix, AZ (US)

(73) Assignee: MCALISTER TECHNOLOGIES, LLC, Phoenix, AZ (US)

(*) Notice: Subject to any disclaimer, the term of this patent is extended or adjusted under 35 U.S.C. 154(b) by 0 days.

(21) Appl. No.: 14/290,789

(22) Filed: May 29, 2014

(65) Prior Publication Data

US 2014/0352801 A1    Dec. 4, 2014

Related U.S. Application Data

(60) Provisional application No. 61/828,640, filed on May 29, 2013.

(51) Int. Cl.
| | |
|---|---|
| *F02M 33/08* | (2006.01) |
| *B60K 15/035* | (2006.01) |
| *B67D 7/32* | (2010.01) |
| *B65D 25/14* | (2006.01) |
| *B60K 15/03* | (2006.01) |

(52) U.S. Cl.
CPC .............. *B60K 15/035* (2013.01); *B65D 25/14* (2013.01); *B67D 7/3209* (2013.01); *B60K 2015/0321* (2013.01); *B60K 2015/03046* (2013.01); *B60K 2015/03315* (2013.01); *Y10T 29/49716* (2015.01); *Y10T 29/53* (2015.01)

(58) Field of Classification Search
CPC ... F02M 25/08; F02M 37/0011; F02M 31/02; F02M 31/12; F02M 37/0076; B65D 25/14; B60K 2015/03309; B60K 2015/03046
USPC ................ 123/519, 522, 523, 536, 538, 557, 123/DIG. 12, 525, 529; 220/581–592
See application file for complete search history.

(56) References Cited

U.S. PATENT DOCUMENTS

| | | | | |
|---|---|---|---|---|
| 4,699,288 | A  * | 10/1987 | Mohan ........................ | 220/590 |
| 5,829,418 | A  * | 11/1998 | Tamura et al. ............... | 123/529 |
| 6,408,867 | B2 * | 6/2002 | Aoki et al. ................... | 137/202 |
| 6,453,885 | B1 * | 9/2002 | Short .......................... | 123/518 |
| 6,591,857 | B2 * | 7/2003 | Engle et al. .................. | 137/202 |
| 6,596,356 | B1 | 7/2003 | Short | |
| 6,742,554 | B1 * | 6/2004 | Immel .......................... | 141/286 |
| 6,840,264 | B1 * | 1/2005 | Bhavsar et al. .............. | 137/202 |
| 7,641,949 | B2 * | 1/2010 | DeLay et al. ................ | 428/35.5 |
| 7,744,127 | B2 * | 6/2010 | Essinger et al. ............. | 280/830 |
| 7,896,190 | B2 * | 3/2011 | Berger et al. ................ | 220/589 |

(Continued)

FOREIGN PATENT DOCUMENTS

EP      1108588 A2    6/2001

*Primary Examiner* — Hai Huynh
(74) *Attorney, Agent, or Firm* — Loeb & Loeb LLP

(57) ABSTRACT

A fuel tank for use with hydrogen carrier fuels. The fuel tank includes a self-supporting shell having an inward facing surface and an outward facing surface. A fluid-tight inner layer is disposed adjacent the inward facing surface and a fluid-tight outer layer is disposed adjacent the outward facing surface. A vent extends through the fluid-tight inner layer, the fluid-tight outer layer, and the self-supporting shell. The fuel tank can also include a gas collection canister connected to the vent.

25 Claims, 18 Drawing Sheets

(56) References Cited

U.S. PATENT DOCUMENTS

| | | | | |
|---|---|---|---|---|
| 8,038,029 B2* | 10/2011 | Lindner et al. | | 220/588 |
| 8,308,017 B2* | 11/2012 | Schlag | | 220/588 |
| 8,561,829 B1* | 10/2013 | Delay | | 220/588 |
| 8,662,343 B1* | 3/2014 | Coors et al. | | 220/586 |
| 8,733,382 B2* | 5/2014 | Suess | | 137/68.12 |
| 8,794,254 B2* | 8/2014 | Maier et al. | | 137/72 |
| 2004/0040969 A1* | 3/2004 | DeLay et al. | | 220/586 |
| 2004/0200460 A1 | 10/2004 | Mitani et al. | | |
| 2005/0178365 A1 | 8/2005 | Washeleski et al. | | |
| 2006/0127733 A1* | 6/2006 | Kaschmitter et al. | | 429/34 |
| 2006/0289546 A1* | 12/2006 | Carter | | 220/565 |
| 2008/0066805 A1* | 3/2008 | Winter et al. | | 137/68.12 |
| 2008/0190943 A1 | 8/2008 | DeMaria et al. | | |
| 2013/0299505 A1* | 11/2013 | Otsubo et al. | | 220/590 |
| 2013/0306652 A1* | 11/2013 | Andernach et al. | | 220/590 |
| 2013/0313266 A1* | 11/2013 | Andernach et al. | | 220/590 |

* cited by examiner

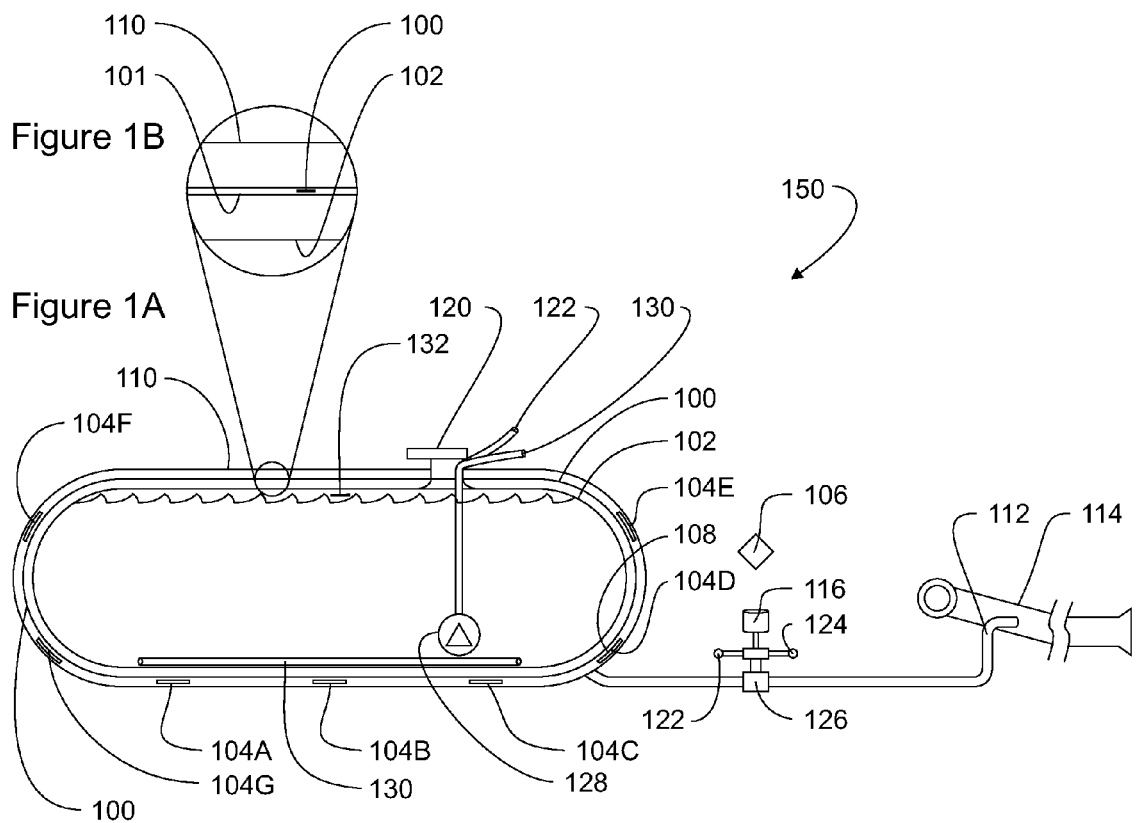
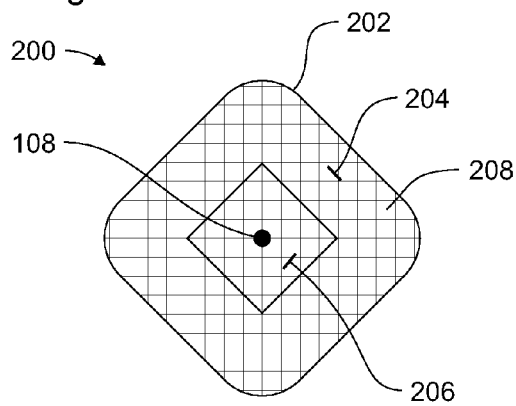
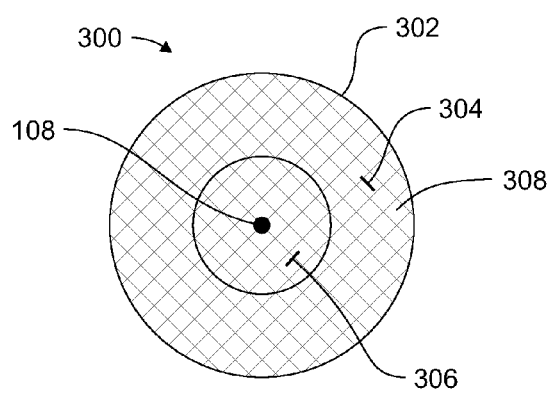

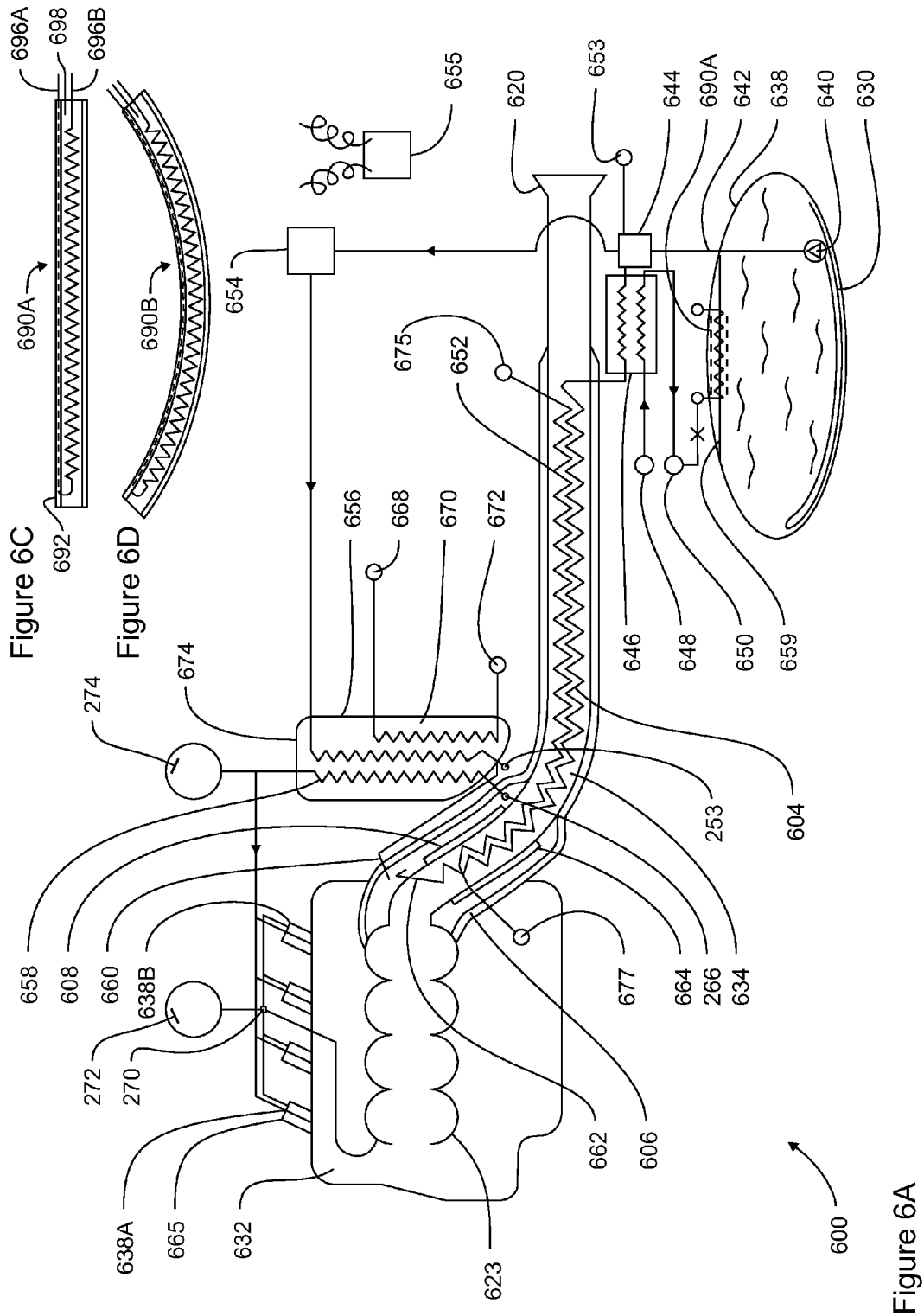

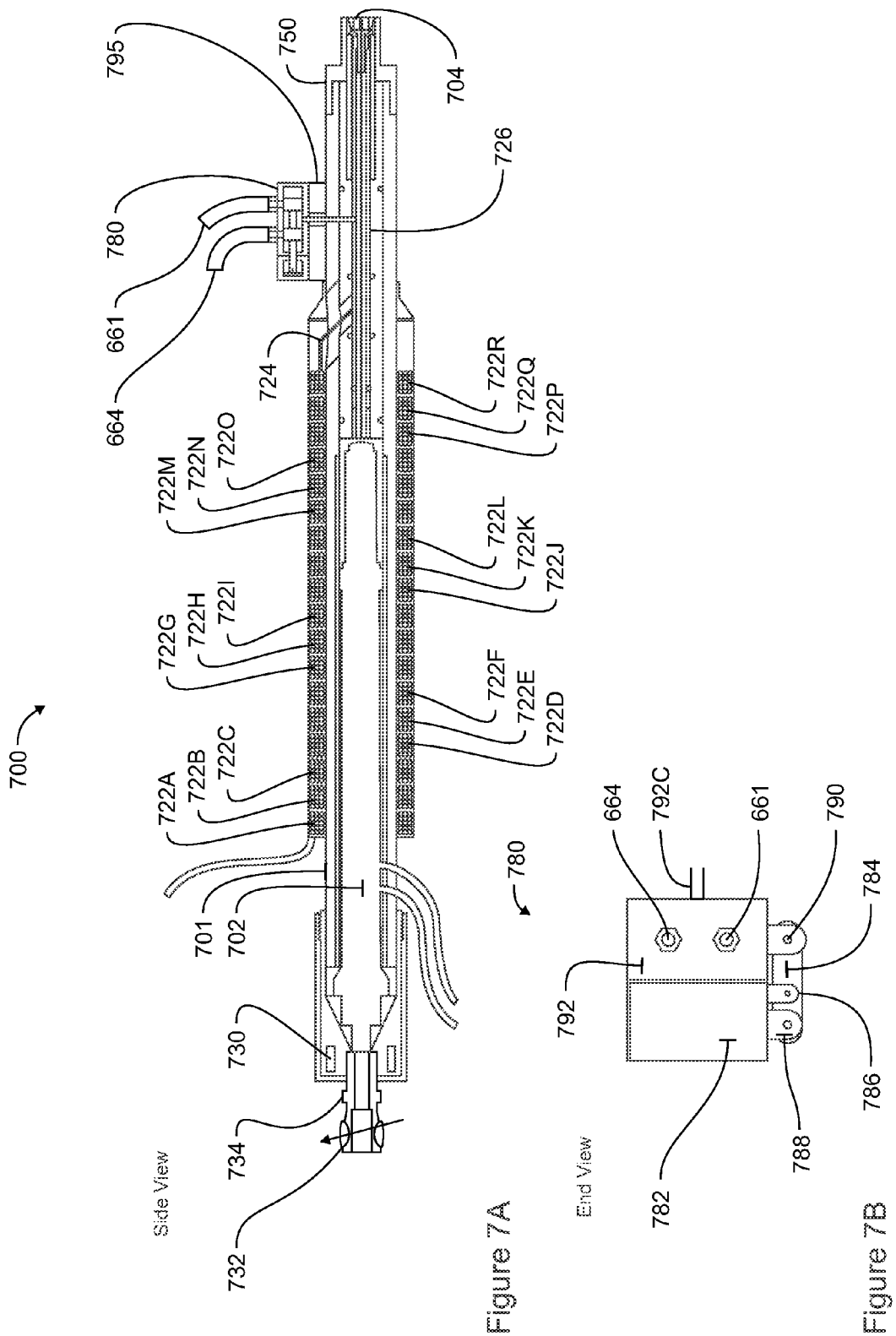

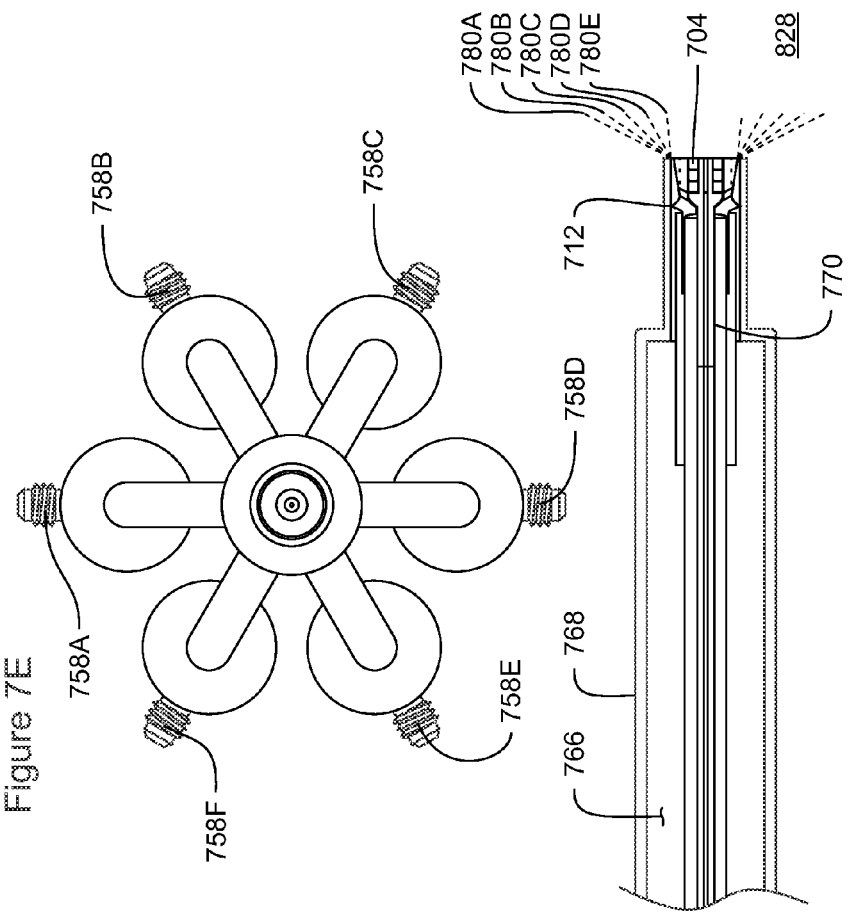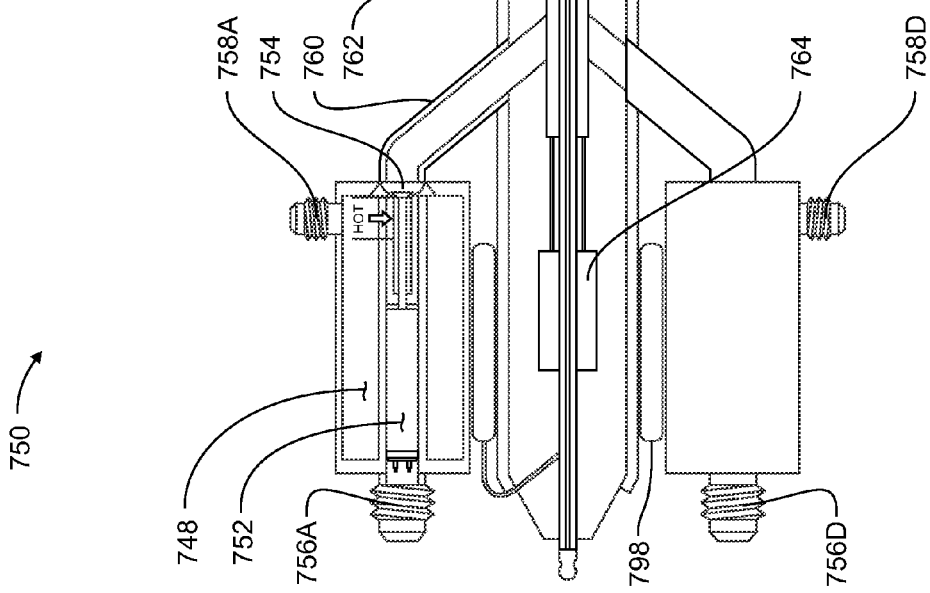

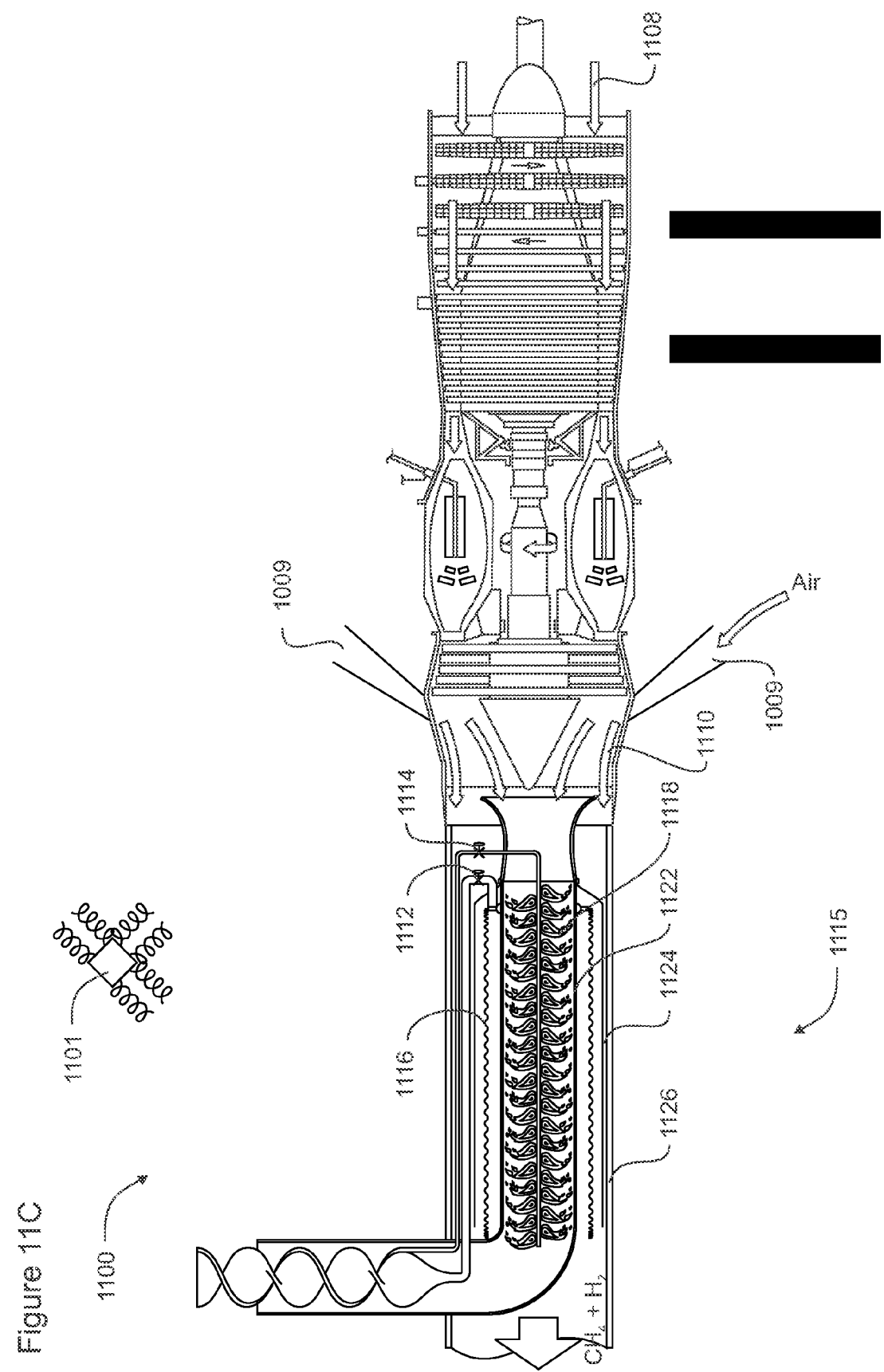

METHODS FOR FUEL TANK RECYCLING AND NET HYDROGEN FUEL AND CARBON GOODS PRODUCTION ALONG WITH ASSOCIATED APPARATUS AND SYSTEMS

CROSS-REFERENCE TO RELATED APPLICATIONS

The present application claims the benefit of U.S. Provisional Patent Application No. 61/828,640, filed May 29, 2013, the disclosure of which is incorporated herein by reference in its entirety.

BACKGROUND

The Industrial Revolution, fueled by combustion of fossil fuels, has provided rapid technology developments including remarkable advancements in agriculture, mining, manufacturing, transportation, electricity generation, medicine, and communication. These advancements have driven unparalleled economic developments that have been progressively undermined by city smog and greenhouse gas pollution of the global environment and damaging climate changes. Planetary-scale gains of solar energy and warming of Earth's atmosphere, oceans, and continents by greenhouse gases are increasingly intensified by mining and burning more than one million years' accumulations of fossil coal, oil, and natural gas each year.

The present stage of the Industrial Revolution adds more than 60 million new vehicles per year to the world's active fleet of about one billion vehicles that are powered by engines designed exclusively and specifically for internal combustion of spark-ignited gasoline or compression-ignited diesel fuel selections. Fuel tanks for this rapidly growing population of vehicles are almost entirely designed for low pressure storage of liquid gasoline or diesel fuel and include subsystems for filtering and admitting air as fuel is removed, minimizing vapor emissions, filtering withdrawn fuel, measuring and providing a signal representing the amount of fuel remaining in storage.

Increasingly expensive and energy-intensive conversion of tar-sands and/or drilling of very deep formations to develop production, long-distance transportation, and refining technologies are required for conversion of crude oil resources into octane-rated gasoline and cetane-rated diesel fuel suitable for storage as liquid fuels at ambient temperature and pressure. Such practices include occasional catastrophes such as the B-P Deepwater Horizon blow-out disaster in the Gulf of Mexico that killed 11 workers, injured 16 others, and continued to spew poisonous brine, crude oil, and natural gas as it produced the largest accidental marine contamination in the world and the most harmful environmental disaster in U.S. history.

The global environment is increasingly subjected to adverse changes due largely to atmospheric accumulations of greenhouse gases such as carbon dioxide, methane, oxides of nitrogen, visible and invisible carbonaceous particulates and various toxins such as benzene and petro-photo-chemical peroxyacetyl nitrate all of which are produced by depletive production and combustion of fossil fuels such as coal, oil, and natural gas to manufacture and then to provide the refined fuel supplies that are combusted by such vehicles. Earth's atmosphere is warming, polar cap and glacier ice is melting at increasing rates and permafrost is decaying along with more extreme weather related events such as damages due to floods, mud-slides, hurricanes, tornados, hail storms and extended droughts in essential agricultural areas.

National Science Foundation's atmospheric science studies show that the relatively short Industrial Revolution has already produced a greater amount of global warming than all planetary warming events of the previous 11,000 years and new all-time high temperatures continue to be measured. Accordingly from now on global temperatures will continue to climb and produce more severe weather extremes as a result of continued dependence upon burning fossil fuels.

The amount of solar energy that enters Earth's atmosphere each year is about $5.5 \times 10^{24}$ J/year, which is a minute fraction of the total solar radiation. Burning fossil fuels and other anthropogenic greenhouse gas production activities now cause an increased solar gain of more than $1 \times 10^{23}$ J/yr. Such greenhouse gas production activities of the industrial revolution have inadvertently plunged our planet into conflict against the ambivalent but undefeatable power of the sun. Greenhouse gases now capture more radiant solar energy every hour than all the nuclear bombs ever exploded and will continue to do so 24-hours a day, 7 days each week. Earth's atmosphere and oceans convert this enormous energy gain into global warming and increased evaporation of the oceans along with increased frequency or severity of hurricanes, thunderstorms, tornadoes, floods, and melting of previously stable ice masses to produce casualties and increasingly expensive destruction of communities and agricultural lands.

Power plants, the transportation sector, and manufacturing operations annually deplete finite reserves of fossil fuels that required more than a million years to accumulate and produce airborne particles and gaseous oxides of carbon, nitrogen, and sulfur. Carbon-rich particles ranging in size from about 2.5 microns and larger that are produced by combustion of hydrocarbons in diesel and gasoline engines are increasingly identified as causes of respiratory diseases, cancer, and cardiovascular problems along with global warming.

Greenhouse gas driven climate changes include warming and degradation of vast permafrost regions, which causes rotting of previously frozen organic deposits and melting of clathrates, which releases methane and carbon dioxide from large land areas. Vast amounts of sea bottom clathrate deposits are also subject to global warming along with ocean current changes that trigger additional releases of methane and carbon dioxide.

The total carbon dioxide emissions by electric power plants in the United States exceeded 2.5 billion metric tons (2.756 Bn tons) in 2007 (Table 4). The largest fuel groups—coal, natural gas, and propane—dominated carbon dioxide emissions, over 94 percent of the total in 2007. Coal alone represented 78 percent of all $CO_2$ emissions by electric power plants, or nearly 2 billion metric tons in 2007.

Combustion of the carbon content of such fossil fuels sacrifices opportunities to produce high-value durable goods including carbon-reinforced equipment for collection of far more renewable solar, wind, moving water, and geothermal energy than provided by burning such carbon. Illustratively it is possible to produce and deliver more electrical energy every month from a carbon-reinforced wind turbine-generator compared to wasteful burning of such carbon in a central power plant.

Carbon donor substances are also lost by allowing organic wastes to directly escape into the atmosphere or to be rotted or burned. Considerable amounts of methane and carbon dioxide from permafrost degradation, landfills, and stranded petroleum production along with animal feeding and milking operations are vented into the atmosphere as highly damaging greenhouse gases because of unsatisfactory systems for collection, storage, transport, and utilization of such gases.

In addition to adverse health and environment implications, the world economy is dependent upon annual combustion of more than a million years' of finite fossil deposits and such detrimental dependence forces economic inflation and ultimate wealth depletion. Factors contributing to wealth depletion include loss of human productivity due to illnesses (i.e. cancers, lung and cardiovascular diseases etc.) caused by stratospheric ozone depletion and pollution of air, water and soil resources; loss of agricultural productivity on polluted, storm damaged, or drought stricken lands; loss of built environments and improvements due to increasing sea levels and damaging intrusions; loss of ocean productivity because of acidification and pollution including loss of market demand and value due to heavy metal contamination; economic inflation due to depletion of finite resources including fossil fuels and critical materials; losses due to attacks by terrorists recruited in response to growing un-employment anguish and despair, and burdensome defense expenses required to protect against terrorist acts and due to conflicts for control of petroleum and other finite resources.

Accordingly there is a need to produce a wealth expansion economy in communities throughout the world to overcome unacceptable wealth depletion caused by the present dependence upon burning more than a million years' of fossil accumulations each year.

SUMMARY

The present hydrogen production, storage, and combustion embodiments have been developed to provide improved performance, extended life, and lower maintenance to actually enable converted engines to perform as air cleaners. Such attractive performance advantages and elimination of objectionable emissions justify hydrogen as an ideal substitute for gasoline and diesel fuels but for more than a century widespread commercial applications have been halted by difficult barriers including higher production costs along with distribution challenges including objectionable energy storage density as a cryogenic liquid, compressed gas, or metal hydride. Such challenges include higher application costs for suitable tanks to store hydrogen as a cryogenic liquid at $-252°$ C. ($-422°$ F.) and/or as a high-pressure compressed gas (680 Bar or 10,000 PSI). Production of hydrogen storage tanks with adequate capacity for the world's billion vehicles and economical disposal of the gasoline or diesel fuel contaminated tanks are difficult economic and environmental protection problems. Petrol tank disposal operations requires hazardous waste treatment including releases of additional greenhouse gases for special processing of gasoline and diesel fuel tanks such as energy-intensive transportation, polymer and heavy metal extraction along with scrubbing requirements to dispose of residual fuel substances and eradicate toxic atmospheric pollutants produced by recycling efforts.

Potential replacement of the existing drive-lines including about one billion internal combustion piston engines and transmissions with hydrogen fuel cells and regenerative electric motors to improve fuel efficiency and greatly reduce greenhouse emissions encounters additional resource availability and economic barriers including mining fossil fuels and mineral ores, refining, and manufacturing fuel cells with platinum catalysts and copper windings for such motors. Wealth expansion produced by the present embodiments stems from conversion of renewable and/or fossil feedstock substances that contain carbon into hydrogen and co-produced carbon-enhanced durable goods. Carbon reinforced equipment converts and delivers more renewable useful energy from sources such as geothermal, solar, biomass, and/or moving air or water than sacrificial and/or wasteful burning or rotting of such feedstock substances. Co-produced hydrogen and omnipresent substances such as atmospheric nitrogen and/or carbon dioxide are utilized to form liquid net-hydrogen carrier fuel embodiments that can be stored in existing or re-cycled and re-purposed gasoline or diesel fuel tanks. Such embodiments allow the world's growing billion vehicle fleet to operate more cost-effectively on "net hydrogen" fuels and reduce or eliminate stratospheric ozone depletion, pollution and/or global warming and consequent damages such as climate changes including more frequent and damaging floods, hurricanes, tornadoes and droughts.

Combustion of carbon in fossil fuels causes economic inflation, depletion, hardship strife and conflict. Conversion of carbon from fossil fuels and other donor substances into carbon enhanced equipment for harnessing renewable solar, wind, moving water, biomass and geothermal resources allows increased production of goods and services to provide an anti-inflationary wealth-expansion economy that overcomes pollution and global warming damages.

The present embodiments are directed to the recycling and repurposing of more than one billion existing vehicles and internal combustion engines to overcome atmospheric pollution and reverse global warming. Opportunities include improved return on investment in the world's population of vehicles and engines. Existing engines are converted to provide better fuel economy, superior performance, longer life, and actually clean the air by "net hydrogen" operation.

After such improved service, engines from transportation applications are recycled and re-purposed for distributed production of electricity, useful heat, and fuel. Such applications can double the energy utilization efficiency compared to conventional central power plants and wasteful use of fossil fuels.

Additional opportunities include advantageous incorporation of wastes in fuel preparations to avoid expenses and environmental damages caused by collection, transport and disposal of sewage, garbage, farm wastes and forest slash. Sustainable economic development provide new jobs to engineer, develop tooling and facilities, manufacture, distribute, and sell durable goods that are stronger than steel and lighter than aluminum along with other carbon-enhanced electrical/electronic products, medical and prosthetic equipment, nano-materials and countless other new products. Many more jobs are required to produce and distribute sufficiently large amounts of "net hydrogen" fuels to replace fossil fuels.

Illustratively for the U.S. economy such sustainable economic development opportunities are equivalent in magnitude to creating more than 1000 new multimillion dollar entrepreneurial ventures per day. The sustainable wealth development opportunity in the world economy amounts to more than 10,000 new multimillion dollar entrepreneurial ventures per day. Durable carbon enhanced goods and equipment includes glazed carbon black roofing that collects more energy every month than burning the carbon once. Such roofing can include provisions for production of electricity, sterilizing potable water and space heating to greatly improve the health, productivity and comfort in dwellings throughout the world as further disclosed in International Application No. PCT/US14/29630, titled Radiant Energy Collectors and Methods Therefor, the disclosure of which is incorporated herein by reference in its entirety.

Fossil hydrocarbons and compounds that contain carbon and hydrogen including organic wastes and crops are digested to produce hydrogen and/or methane and/or otherwise dissociated into carbon and hydrogen as summarized by Equation 1.

$$C_yH_z + HEAT \rightarrow yC + 0.5zH_2 \quad \text{Equation 1}$$

Such carbon is utilized to manufacture durable goods such as fiber-reinforced transportation components that are lighter than aluminum and stronger than steel; diamond-like coatings on equipment and architectural components for chemical and wear resistance, and thermal flywheels for roofing and curtain-wall products that collect more solar energy every month than burning such carbon; and equipment for harnessing solar, wind, moving water, and geothermal resources to produce 1000 times or more energy than combustion of the carbon feedstock.

At a stationary fuel preparation and dispensing station carbon is extracted from feedstock such as renewable methane or natural gas as shown in Equation 1 and the co-produced hydrogen is combined with carbon dioxide ($CO_2$) and/or nitrogen ($N_2$) which is preferably taken preemptively from the exhaust stack of a power plant, brewery, bakery, calciner, ethanol plant, or aerobic/anaerobic digester or from the atmosphere to produce net hydrogen liquid fuels such as shown in Equations 2A-4C.

Co-produced hydrogen is reacted with carbon dioxide and/or nitrogen directly from the atmosphere or indirectly from more concentrated sources such as fossil fueled (coal, oil, or natural gas) power plants, Portland cement calciners, ethanol plants, breweries or bakeries and/or by collection of vast amounts of carbon dioxide, water, and methane from destructive warming of permafrost and oceanic clathrate formations to produce fluid fuels such as ammonia, urea, fuel alcohols, and various other compounds as summarized in Equations 2A, 2B, 3, 4. (Carbon monoxide can be converted to carbon monoxide by the Boudouard shift or produced by Water Gas reactions. This approach to use carbon monoxide instead of carbon dioxide can be utilized to reduce or eliminate the co-production of water in reactions such as 2A, 2B, 4A etc.)

$$3H_2 + CO_2 \rightarrow CH_3OH + H_2O \quad \text{Equation 2A}$$

$$4H_2 + 2CO \rightarrow C_2H_5OH + H_2O \quad \text{Equation 2B}$$

$$3H_2 + N_2 \rightarrow 2NH_3 \quad \text{Equation 3}$$

$$3H2 + CO2 + N2 \rightarrow CON2H4 + H2O \quad \text{Equation 4}$$

In instances that pressure rated tanks such as compressed natural gas or hydrogen tanks are repurposed for present purposes the refurbished and requalified tank may be partially filled i.e. 30% to 90% by volume with net-hydrogen liquid fuel selections and the remaining volume is filled with a pressurizing expander such as gaseous $H_2$ or ($H_2+CH_4$) or ($H_2+C_3H_6$) etc. to increase the range. The pressurizing expander may be selected to provide a phase change upon gaining heat such as from the engine coolant (H-1), and/or the exhaust gases (H-2) and/or from regenerative energy (H-3) and thus serve as the primary pressure source for delivering the liquid contents before the gas contents are utilized as fuel.

In some embodiments a pressurizing expander mixture 659 such as hydrogen and a change of phase agent such as ammonia, propane, or butane, is utilized. Heat addition such as H-1, H-2 and/or H-3 is utilized at controlled times (i.e. from 648) to vaporize the pressurizing expander such as butane and provide pressurized delivery of the net-hydrogen liquid fuel. At times the engine is off the butane portion of the pressurizing expander cools and condenses to sufficiently reduce the tank pressure to allow hydrogen (i.e. from the process of Equation 1, 5, 6, 7 or 8) to be recharged into tank 638 at lower, equal or higher pressure than required for delivery of the liquid fuel. Such hydrogen or hydrogen or hydrogen characterized gas blend can be used for clean starts of cold engines. Subsequently upon becoming available as the engine warms up the pressurizing expander is heated to produce suitable phase change to pressurize the tank for delivery of the liquid fuel contents.

Various other liquid blends combine net-hydrogen substances with soluble wastes derived from garbage, sewage, farm wastes or forest slash or with nitrogen and carbon dioxide to make nitrogenous compounds such as nitromethane (CH3N2O), nitromethanol (CH3NH2), or urea (CH4N2O) to improve energy density and provide greater range.

Such liquid fuels that are produced from hydrogen, carbon dioxide and/or nitrogen allow existing gasoline and diesel fuel tanks to be recycled and re-purposed for storage and transport of hydrogen at greater energy densities than compressed or cryogenic hydrogen (and similarly at greater energy densities than compressed or cryogenic natural gas).

Proprietary fuel compositions allow higher Thermo Chemical Regeneration (TCR) that convert conventionally wasted energy into fuel-value and pressurization gains. Such compositions include emulsions and suspensions of various additional carbon, nitrogen, and/or hydrogen donor substances "dC" including extracts from garbage, sewage, industrial, and agricultural wastes.

Illustratively, a representative fuel preparation embodiment as shown in Equation 5 that is reacted with engine waste heat transfers from the coolant, exhaust gases, and/or regenerative energy from combustion chamber gas compression, brakes and/or shock absorbers to provide more than 140% of the combustion energy compared to burning the feedstock methanol ($CH_3OH$).

$$CH_3OH + \text{"dC"} + H_2O + HEAT_5 \rightarrow 3H_2 + 2CO \quad \text{Equation 5}$$

In addition, the process shown in Equation 5 may use a TCR system that provides high-value separation and pressurization of the hydrogen and carbon monoxide fuel constituents that are produced by low-grade heat and/or complementary regenerative energy conversions. (Similarly beneficial hydrogen separation and pressurization is provided for nitrogenous feed stocks.)

In the illustrative operation of Equation 5, two moles of liquid fuel compounds and one mole of dissolved solid compound are thermo-chemically re-speciated into five moles of self-pressurized gases. Such self-pressurized gases can be separated into Joule-Thomson (J-T) expansive cooling gas such as carbon monoxide for delivery before TDC and J-T expansive heating gas such as hydrogen for delivery at or after TDC.

Further improvements in engine efficiency are provided by the self-pressurized gaseous constituents including expansive Joule-Thomson (J-T) cooling by carbon monoxide injection as a stratified charge before Top Dead Center (TDC) to cool the hottest air and reduce the work of unthrottled air compression and expansive J-T heating by one or more stratified charge injections of hydrogen after TDC to increase the expansive work before and after combustion to greatly increase the net Brake Mean Effective Pressure (BMEP) of the host engine. Expansive J-T heating of hot, pressurized, stratified hydrogen greatly reduces the energy requirement for ignition by Lorentz thrust ions and/or corona discharge that beneficially occurs in the hot hydrogen injection rays and patterns penetrating into compressed air.

This overall regime thus allows the engines of more than one billion existing vehicles to operate with existing fuel tanks that are re-purposed and fitted with embodiments that provide "net hydrogen fueling" by operations that reduce the burden of carbon dioxide and other greenhouse contaminants in the global atmosphere. Significant reductions of carbon dioxide in the global atmosphere are achieved by production of carbon characterized durable goods that are lighter than aluminum and stronger than steel along with so many other outstanding advantages as stated for net-hydrogen fuels and summarized by Equation 5 for sustainable, anti-inflationary, economic development throughout the world.

BRIEF DESCRIPTION OF THE DRAWINGS

The disclosed technology may be better understood by referring to the following Detailed Description in conjunction with the accompanying drawings, in which like reference numerals indicate identical or functionally similar elements:

FIG. 1A illustrates a repurposed fuel tank according to a representative embodiment.

FIG. 1B illustrates an enlarged section view of the tank shown in FIG. 1A.

FIG. 2 illustrates a weep port according to a representative embodiment.

FIG. 3 illustrates a weep port according to another representative embodiment.

FIG. 6A is a partial sectional view of a thermochemical regenerator according to a representative embodiment.

FIGS. 6C and 6D illustrate representative embodiments of pressurizing expansion gas heaters.

FIG. 7A is a cross-sectional side view of an integrated injector/igniter according to a representative embodiment.

FIG. 7B is an end view of the injector/igniter shown in FIG. 7A.

FIG. 7D is a cross-sectional side view of an integrated injector/igniter according to another representative embodiment.

FIG. 7E is an end view of the injector/igniter shown in FIG. 7D.

FIGS. 11A-11D illustrate selected configurations of a repurposed gas turbine engine according to representative embodiments.

Figure 4:
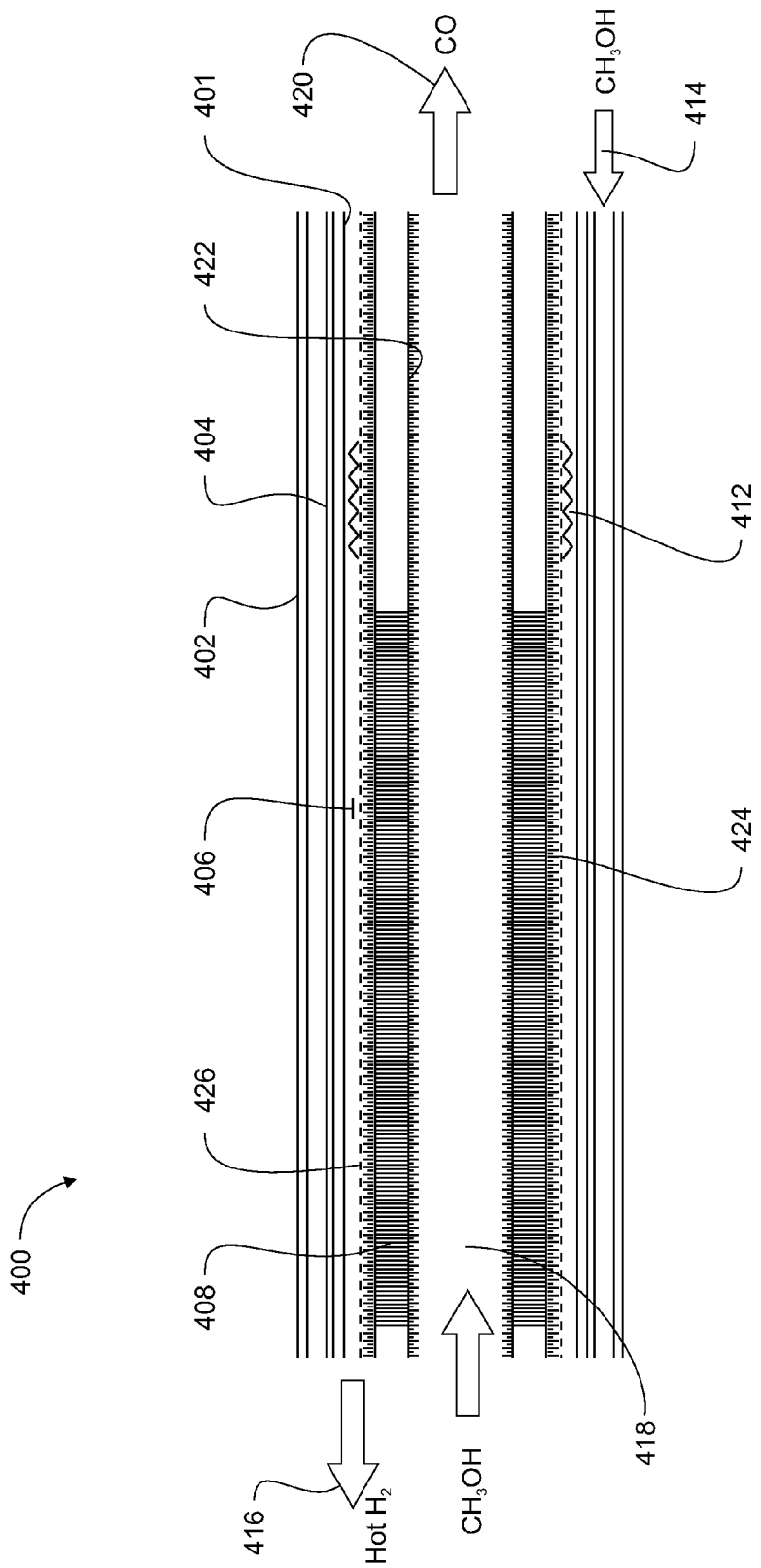
FIG. 4 is a partial sectional view illustrating a canister construction according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Various urban legends suggest that the amount of energy that could possibly be supplied from biomaterials including organic wastes and energy crops is insufficient to replace present production of energy by fossil fuels. These legends are untrue but widely believed because of the myopic assumption that carbon in such feedstock materials is combusted one-time to produce energy.

Embodiments are disclosed for sustainable energy production that substantially exceeds one-time combustion of fossil fuels. Present embodiments provide for sustainable energy production by carbon-enhanced equipment. Carbon for reinforcing or otherwise enhancing the capabilities and performances of energy conversion equipment is extracted from organic wastes and energy crops and/or methane from decaying permafrost and/or oceanic deposits of clathrates (particularly methane hydrates) and/or from fossil fuels.

This allows cost-effective production and applications of carbon-reinforced or otherwise enhanced components and equipment to harness solar, wind, moving water, geothermal and other energy resources. Illustratively carbon reinforced wind and water turbines and/or other equipment such as ocean thermal energy conversion systems can harness far more than 1000 times the amount of energy produced by one-time sacrificial burning of such carbon. Carbon for enabling sustainable energy conversion practices is co-produced along with hydrogen from such carbon and hydrogen donor materials.

In many ways hydrogen is an ideal fuel that combusts in a wide range of air/fuel ratios, produces about three-times more heat per mass unit than petrol fuels such as gasoline, jet and diesel fuels. Hydrogen can be substituted for gasoline and diesel fuel by various combinations of the present embodiments to overcome production of carbon particles, carbon monoxide, carbon dioxide, oxides of nitrogen, and sulfur-based pollutants.

However the specific energy storage density (e.g. combustion mega-joules per volume or MJ/Liter) of gaseous hydrogen at ambient temperature and pressure is about 3,700 times lower than liquid diesel fuel and 3,400 times less than gasoline. Further, in comparison with liquid hydrocarbon fuel compounds, hydrogen molecules are much smaller and present far lower bulk viscosity to readily leak and escape through previously ignored defects that would not allow leakage of petrol fuels from fuel tanks.

Table 1 compares energy densities of various fuels.

TABLE 1

Fuel Energy Density Comparisons

| Storage type | Gravimetric Energy | Volumetric Energy Density |
|---|---|---|
| Hydrogen, gas, 1 bar, | 141.86 | 0.01005 |
| Hydrogen, gas, 690 bar, | 141.86 | 4.5 |
| Hydrogen, liquid | 141.86 | 8.491 |
| Lithium borohydride | 65.2 | 43.4 |
| Methane (1.013 bar, | 55.6 | 0.0378 |
| Natural Gas | 53.6 | 0.0364 |
| LNG (NG at −160° C.) | 53.6 | 22.2 |
| CNG (NG 250 bar/3.6 | 53.6 | 9 |
| LPG propane | 49.6 | 25.3 |
| LPG butane | 49.1 | 27.7 |
| Gasoline (petrol) | 46.4 | 34.2 |
| Polypropylene plastic | 46.4 | 41.7 |
| Polyethylene plastic | 46.3 | 42.6 |
| Diesel fuel/heating oil | 46.2 | 37.3 |
| 100LL Avgas | 44.0 | 31.59 |
| Gasohol E10 10% Eth | 43.54 | 33.18 |
| Jet A aviation fuel | 42.8 | 33 |
| Biodiesel veg oil | 42.20 | 33 |
| Ammonia | 18.6 | 11.5 |
| Polystyrene plastic | 41.4 | 43.5 |
| Butanol | 36.6 | 29.2 |
| Ethanol | 30 | 24 |
| Methanol | 19.7 | 15.6 |
| Gasohol E85% vol | 33.1 | 25.65 |
| Graphite | 32.7 | 72.9 |
| Silicon | 32.2 | 75.1 |
| Aluminum | 31.0 | 83.8 |
| Magnesium | 24.7 | 43.0 |
| Coal, bituminous | 24 | 20 |

Reference: (http://en.wikipedia.org/wiki/Energy_density).

The present embodiments facilitate the production of and applications of "net hydrogen liquid fuels" for sustainable economic development that otherwise will be increasingly lost as the growing vehicle production as shown is dedicated to fossil-sourced gasoline and diesel fuels. Typical processes for converting carbon donor substances such as $C_XH_Y$ including fossil and renewable compounds into valuable carbon based durable goods particularly include carbon-reinforced equipment. In the processes summarized "xC" depicts carbon enhanced equipment that delivers many times more energy than can be released by combustion, whereby the xC application provides sustainable conversion of solar, wind, moving water, and geothermal energy sources along with co-production of hydrogen.

TABLE 2

Summary of 2011 global car production:

| Rank | Country | Cars Produced | % of Total World Production |
|---|---|---|---|
| 1 | China | 14,485,326 | 24.0% |
| 2 | Japan | 7,158,525 | 11.9% |
| 3 | Germany | 5,871,918 | 9.7% |
| 4 | South Korea | 4,221,617 | 7.0% |
| 5 | India | 3,038,332 | 5.0% |
| 6 | U.S.A. | 2,966,133 | 4.9% |
| 7 | Brazil | 2,534,534 | 4.2% |
| 8 | France | 1,931,030 | 3.2% |
| 9 | Spain | 1,819,453 | 3.0% |
| 10 | Russia | 1,738,163 | 2.9% |

TABLE 2-continued

Summary of 2011 global car production:

| Rank | Country | Cars Produced | % of Total World Production |
|---|---|---|---|
| 11 | Mexico | 1,657,080 | 2.8% |
| 12 | Iran | 1,413,276 | 2.3% |
| 13 | U.K. | 1,343,810 | 2.2% |
| 14 | Czech Republic | 1,191,968 | 2.0% |
| 15 | Canada | 990,483 | 1.6% |

As partially shown by comparison of the top 15 manufacturers in Table 2, Asia and Oceania produced about 50%, and Europe produced about 30% of 2011 production. These top producers are spurred by economic stimulus efforts and can be anticipated to increase production to meet growing market demands, particularly in Oceania and Eastern Europe.

Sustainable economic development opportunities including job development and environmental protection are provided by the present embodiments. Process features and benefits include:

1) Highly favorable economic incentives are provided for conversion of substantial portions of the billion vehicles in the global fleet to operation on hydrogen that is stored in ambient temperature liquid compounds that are made from hydrogen and one or more substances from the global atmosphere such as nitrogen and/or carbon dioxide. Representative liquids that serve as net-hydrogen carrier fuels (HCFs) include $NH_3$, various alcohols such as $CH_3OH$ and $C_2H_5OH$ along with other fuel compounds that provide considerably higher hydrogen storage density than cryogenic liquid hydrogen.

2) Cost-effective utilization of concentrated sources of substances such as carbon dioxide or nitrogen to form such liquid HCFs as hydrogen-carrier fuel compounds is provided. Collection of such concentrated carbon dioxide and/or nitrogen sources improves the overall efficiency of removing greenhouse gases from the atmosphere. Representative sources of concentrated carbon dioxide and/or nitrogen include the exhaust gases of fossil fueled engines that range in size from small mobile engine-generators to coal-fired power plants, mineral calciners such as Portland cement plants, waste digestion systems, ethanol plants, bakeries and breweries. In many instances utilization of such concentrated sources of carbon dioxide and/or nitrogen includes collection of hot gases to further reduce the amount of energy required for collection, separation, and formation of the desired HCF.

3) Cost-effective recycling and remanufacturing of the fuel tanks for about one billion vehicles including provisions for fail-safe storage and utilization HCFs without leakage of fumes during re-fueling, extended storage and/or use.

4) Energy conservation and improved performance is provided by recycling and remanufacturing the internal combustion engine exhaust systems of vehicles to provide counter-current heat transfer to the HCF for endothermic reactions that produce hydrogen. Representative endothermic reactions include:

$$CH_3OH + HEAT_6 \rightarrow CO + 2H_2 \quad \text{Equation 6}$$

$$C_2H_5OH + H_2O + HEAT_7 \rightarrow 2CO + 4H_2 \quad \text{Equation 7}$$

$$2NH_3 + HEAT_8 \rightarrow N_2 + 3H_2 \quad \text{Equation 8}$$

5) In certain embodiments further improvement of energy conversion efficiency is achieved by remanufacturing the exhaust manifolds of exhaust systems with directed heat focusing and containment features to support high temperature endothermic reactions that produce and separate hydrogen from other products of such reactions.

6) For some applications, recycling and remanufacturing of the exhaust systems includes incorporation of subsystems for collection of steam or water from the exhaust gases. Representative subsystems include high temperature separators and/or work-extracting turbo-motors or exducers that condense and collect water.

7) For some applications, recycling and remanufacturing of the exhaust systems includes electrolytic separators that dissociate hot steam and transport separated oxygen by oxygen-ion membranes and/or hydrogen by hydrogen-ion membranes (such as summarized by Equation 29) to allow such separated oxygen to be utilized for partial-combustion reactions such as:

$$C_2H_5OH+O_2 \rightarrow 2CO+3H_2+HEAT_9 \qquad \text{Equation 9}$$

8) Recycling and remanufacturing of said exhaust systems includes provisions to host and provide for fail-safe emergency combustion of HCF, hydrogen or other fluids along with pressure blow-down and cooling of the products of such combustion.

9) Existing spark plugs or diesel fuel injectors in internal combustion engines are replaced with devices that combine injection and ignition of HCFs and/or the gaseous products produced by reactions typical to Equations 6-9.

10) Engine operation with improved performance and higher thermal efficiency is provided by admitting unthrottled normally aspirated and/or supercharged air into the combustion chambers of converted ICEs with direct injection into said combustion chambers by the devices that combine injection and ignition of said HCFs and/or respeciated or reformed gaseous fuel derivatives. Supercharging includes utilization of one or more of the host engine's combustion chambers as air and/or fuel compressors to provide regenerative braking and storage of compressed air or fuel. Following such braking compressed air and/or fuel is injected into selected combustion chambers to increase vehicle fuel efficiency, brake mean effective pressure (BMEP) and performance.

11) Multi-cylinder engines such as selections from wrecked vehicles are equipped to operate selected cylinders for production of compressed gases and/or to supply energy to convert hydrogen and/or carbon donor substances such as $C_XH_Y$ into carbon for manufacturing durable goods and hydrogen for preparation of HCFs. A representative carbon and hydrogen donor substance is natural gas or methane from decaying permafrost, anaerobic waste digesters or landfills which is converted to durable carbon such as nano-tubes, graphite fiber, graphene and other forms of reinforcement for equipment to harness renewable energy resources and/or to produce HCFs such as ammonia and/or oxygenated fuels as fuel alcohols, formic acid, MTBE, or urea.

$$CH_4+HEAT_{10} \rightarrow C(\text{Durable Goods})+2H_2 \qquad \text{Equation 10}$$

$$CO_2+3H_2 \rightarrow CH_3OH(HCF) \qquad \text{Equation 11}$$

Existing piston engine-powered drivelines are converted to HCF including thermochemically regenerated hydrogen for un-throttled, stratified-charge operation for greatly reducing or eliminating greenhouse gas problems and achieving fuel efficiency equivalent to fuel cells and electric motors in many practical applications. Hydrogen fueled internal combustion engines operated by the present embodiments can actually clean the air that enters such engines compared to fuel cells that do not provide such air cleaning benefits. Existing tanks for storage and transportation of liquid fossil fuels are recycled and re-manufactured including integration with subsystems that provide improved storage and safer applications of new fuel preparations that provide the net result of hydrogen combustion in converted engines. Collateral achievements include reduction or elimination of wasteful combustion of carbon and economic development sacrifices that result.

Feedstock compounds that contain carbon and hydrogen are processed to produce durable carbon goods and equipment along with hydrogen. Economical hydrogen-carrier fuels (HCFs) are produced that can be stored and/or transported at ambient temperature and pressure in such re-purposed tank assemblies. HCFs are produced by combining such co-produced hydrogen with carbon dioxide from concentrated sources such as bakeries, breweries, calciners, ethanol plants, aerobic or anaerobic digesters, and the exhaust gases from furnaces, engines, and fuel cells that use coal, oil or natural gas fuels.

Suitable tanks for such recycling, re-manufacturing and re-purposing include virtually any gasoline or diesel fuel tank from existing service. Fuel tanks are re-purposed with new capabilities including improved performance, safety, and durability. Hydrogen-carrier fuels are utilized in thermo-electro-chemical re-speciation systems to provide hydrogen accelerated initiation and completion of combustion in engines and furnaces and/or reactions in fuel cells.

Durable good selections that stimulate sustainable economic developments include designs that stimulate conversions of existing and new vehicles to operation on "net hydrogen liquid fuels" and related systems.

$$C_XH_Y+HEAT_{12} \rightarrow xC+0.5yH_2 \qquad \text{Equation 12A}$$

Equation 12B summarizes processes for converting heat rejected by a heat engine and/or a vehicle and carbon donor substances such as fossil natural gas, waste digester gas, permafrost or landfill sourced methane ($CH_4$) into carbon-reinforced equipment and various other carbon-based durable goods (dC) along with co-production of hydrogen ($H_2$).

$$CH_4+H\text{-}1,H\text{-}2, \text{and/or } H\text{-}3 \rightarrow dC+2H_2 \qquad \text{Equation 12B}$$

In another embodiment hydrocarbons re regeneratively preheated and partially combusted as shown in Equation 13 for methane to produce sufficient heat to dissociate the remaining inventory of hydrocarbon feedstock into carbon and hydrogen.

$$3CH4+(H\text{-}1,H\text{-}2 \text{ and/or } H\text{-}3)+O2 \rightarrow 2CO+C+6H2 \qquad \text{Equation 13}$$

The process embodiment summarized by Equation 13 can be improved by supplying the oxygen from H-1, H-2, and/or H-3 heated steam to an electrolyzer that transports dissociated hydrogen across a proton membrane which may be galvanically pressurized. Alternatively an electrolyzer may be selected that transports oxygen across an ion membrane such as zirconia to provide such oxygen which may be galvanically pressurized to a suitable reaction pressure.

Co-produced hydrogen is reacted with nitrogen from the atmosphere and/or carbon dioxide from the atmosphere or from more concentrated sources to produce liquids or solids including selected compounds such as ammonia, urea, formic acid and fuel alcohols (i.e. $NH_3$, $CON_2H_4$, $HCOOH$, $CH_3OH$, $C_2H_5OH$, $C_3H_8OH$, etc.) that are formed as hydrogen carrier fuels (HCFs) to densely store hydrogen as a liquid or mixture of substances such as shown by the illustrative examples summarized by Equations 14 and 15.

$$N_2+3H_2 \rightarrow 2NH_3 \qquad \text{Equation 14}$$

$$CO_2+3H_2 \rightarrow CH_3OH+H_2O \qquad \text{Equation 15}$$

Illustrative options include separation of methanol and water by suitable processes such as distillation using engine waste heat; pressure and/or temperature swing adsorption (PSA or TSA) systems, and/or reverse osmosis to increase the hydrogen storage density of the methanol fuel. In other embodiments the wet methanol serves as a solvent or medium for other fuel values such as soluble, suspended, and/or emulsified additions of carbon, nitrogen, and/or hydrogen donors such as waste substances extracted from sewage, garbage, farm wastes or forest slash.

Cellulose is the major component of green plant tissues and it is secreted to produce biofilms by many types of bacteria. Various forms and molecular weights of cellulose are found in a wide range of wastes from domestic, metropolitan, and agricultural sources. Numerous thermal, electrolysis, digestion, and enzyme dissociation systems have been developed to allow cellulose to be dissociated to hydrogen and/or carbon dioxide. For example, Y. H. Percival Zhang at Virginia Tech has reported a way to extract large quantities of hydrogen from any plant. See http://www.kurzweilai.net/breakthrough-in-hydrogen-fuel-production-could-revolutionize-alternative-energy-market Such hydrogen production options can allow low-cost preparations of typical net hydrogen liquid fuels by reactions shown as Equations 14 and 15.

Fuel alcohols including methanol and other liquid fuels produced by reactions, such as shown by the representative equations presented, provide important ways to store and transport energy. Such liquid fuels allow existing gasoline or diesel fuel tanks to be re-purposed for much more appropriate storage of liquids that reduce or reverse global pollution, cost much less, and allow regenerative applications of engine waste heat and/or other regenerative energy and/or off-peak conversions to thermo-chemically increase the energy produced compared to amount of energy released by combustion of the original feedstock substances (i.e. $C_yH_z$ or $CH_4$, $CH_3OH$, $C_2H_5OH$, $HCOOH$, etc.)

Illustratively solvents such as methanol and/or water can be used to suspend or dissolve many carbon and/or hydrogen donor wastes such as cellulose, urea, grain dust, and food wastes that would ordinarily be allowed to be destroyed by waste treatment systems, or rot in garbage or municipal waste landfills because they are too wet or not in suitable liquids including octane or cetane qualifications that support combustion in conventionally operated engines. Equation 16 shows an embodiment for utilizing a solution or suspension of various wastes that at least provide carbon and hydrogen by the general combination ($C+H_2O$). Adjustment of the water content of blended substances provides improved energy density and safety resulting from the reduced toxicity of wet alcohols and solvents and fire suppression enablement by water content and solubility.

$$CH_3OH+(C+H_2O)+HEAT_{16} \rightarrow 2CO+3H_2 \quad \text{Equation 16}$$

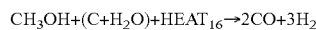

32 lb+12 lb+18 lb+HEAT=56 lb+6 lb      TCR Mass Balance 17

As shown by TCR Mass Balance 17, combustion of 32 lb of feedstock ($CH_3OH$) would provide about 276,441_BTU compared to combustion of 56 lb of carbon monoxide to produce 243,488 BTU and 6 lb of hydrogen to produce 154,755 BTU or a total of 398,243 BTU. This energy gain advantage can be further increased by injection of carbon monoxide before TDC to produce J-T expansive cooling and improve BMEP and/or injection of hydrogen at or after TDC to produce J-T expansive heating to further improve BMEP, performance, and fuel efficiency.

Figure 8:
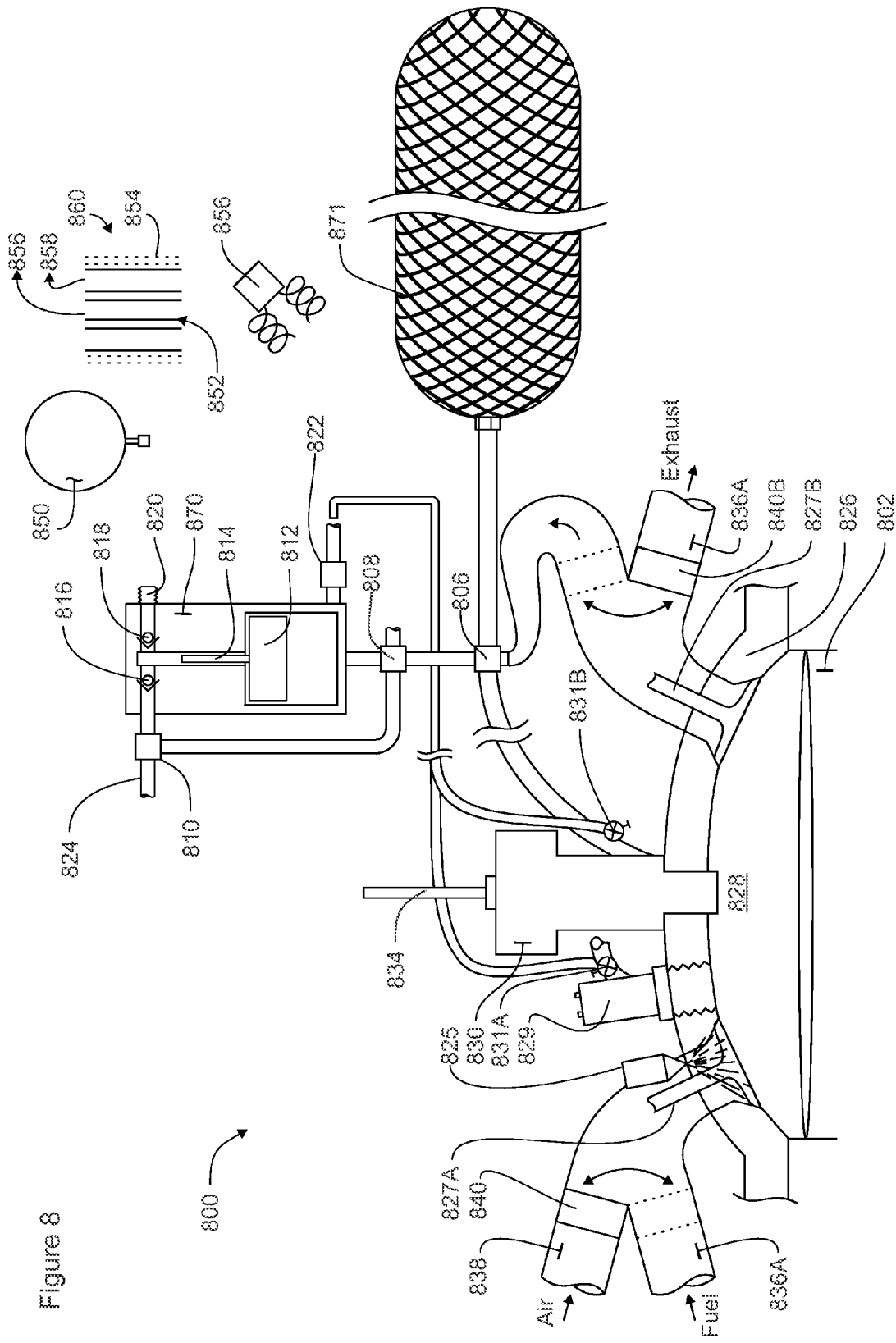
FIG. 8 is a partial sectional view of a repurposed combustion chamber according to a representative embodiment.

Particularly efficient vehicle operation is provided by regenerative braking performed by embodiment 800 of FIG. 8. At various times such as when compressed gas is needed and/or at times that regenerative deceleration is desired, combustion chamber 828 is operated as a compressor for fluids such as fuel and/or air admitted through conduits 838A or 836A as determined by one or more suitable valves such as a slide or swing valve 840A. The selected fluid such as air flows through one or more intake valves 827A during the intake stroke and is compressed for delivery through valve 831A and/or 831B during compression to tank 871 for storage. Additional back work and regenerative deceleration may be provided by admitting additional compressed gas (such as fuel, air or another oxidant) from tank 871 or a similar tank after valves 827A and 827B are closed to increase the inventory of gas undergoing compression.

Such compressed air including further pressurization in selected embodiments that utilize intensifier 870 can be separated into oxygen, nitrogen, carbon dioxide, and argon group rich inventories by suitable filtration such as by membrane filters 852 in assembly 860 can be utilized as cartridges in intensifier 870 or in a conduit connected to outlet 820 for various purposes including improvement of the volumetric efficiency of the host engine, partial combustion, and fuel cell reactions. Fuel substances that are compressed by such regenerative braking may similarly be further compressed by 870 or an intensifier similar to 870 to provide denser storage, higher velocity stratified corona susceptor patterns, or to facilitate reactions such as production of methanol, ethanol, butanol, formic acid, DME or DEE as depicted for HCF production by Equation 18.

Greatly improved corona ignition efficiency is provided by injecting ignition agents that produce and/or further energize ions and do so with less corona energy than nitrogen, oxygen and other constituents of the surrounding air. Such corona susceptor patterns in or that accompany fuel and air mixture patterns provide greatly improved corona ignition efficiency and accelerate the initiation and completion of combustion to produce stratified heat within surrounding air.

Representative susceptor or susceptibility agents for corona discharge include previously ionized particles, argon, and hydrogen. Previously ionized particles include oxygen that can be produced and separated from hydrogen by steam electrolysis as shown in Equation 29 in which hydrogen can be transported by a proton membrane to shift the reaction in favor of higher yields. Such oxygen can be injected and ionized just prior to hydrogen injection to serve multiple functions including improvement of volumetric efficiency, increased oxygen availability in the path of subsequent fuel injection, and to provide an effective susceptor pattern for corona ignition streamers. Similarly beneficial corona susceptibility is produced by oxides of nitrogen and other radicals that are formed by reaction with such activated oxygen.

Direct injection at or after TDC of one or more stratified charge patterns of hydrogen penetrating into surplus air in the combustion chamber provides another pattern enhancement for efficient corona discharge streamers to produce multitudes of stratified combustion nucleation sites to accelerate initiation and completion of combustion. Such hydrogen induced corona discharge without spark erosion of electrodes assures maintenance free life of the injection and ignition system shown in FIGS. 7A and 7D. Injection of hot hydrogen that is further heated by J-T expansion provides additional susceptibility for efficiently defining the corona ignition pattern to rapidly combust fuel-air mixtures that such injection forms.

In some embodiments air and/or fuel that is compressed by embodiment 800 including normally aspirated, supercharged, boosted by additional gas and/or further pressurized by intensification of the air and/or fuel for purposes of delivery through injector 825 to induce greater flow of air from conduit 838A and/or fuel from conduit 836A into combustion chamber 828 at times that intake valve 827A opens. This improves volumetric efficiency, BMEP, performance, and fuel efficiency and such improvements can be further bolstered by subsequent direct injection of fuel through injector 830. Further improvements are achieved by separation of pressurized hydrogen for injection after TDC to provide expansive heating and greatly accelerated combustion of any other fuel constituent such as carbon monoxide admitted through conduit 836A and/or by injector 825.

In certain embodiments compressed air provided by operation of the embodiment 800 is delivered from tank 871 and/or from intensifier 870 is separated by suitable filtration systems into pressurized inventories of oxygen, nitrogen and the argon group including other susceptor gases such as neon, krypton, and xenon. Argon group susceptors are added to fluid such as carbon monoxide, methanol vapor, methane, etc. delivered through conduit 834 to injector 830 to provide one or more stratified patterns of susceptor agents and fuel particles near TDC to reduce ion energy production requirements and greatly improve corona ignition efficiency. Further improvement in operating efficiency is provided by addition of argon group selections to hydrogen for injection at or after TDC to provide greatly accelerated combustion of any other fuel constituent such as carbon monoxide admitted through conduit 836 and/or by injector 825.

Such separated oxygen can be utilized in various ways including addition to the air in conduit 838 and/or for injection through injector 825 and/or for addition through valve 831A and/or 831B for increasing the oxygen content of air in combustion chamber 828. It is particularly beneficial to add such oxygen through valve 831B and/or 831A to produce oxygen-rich air in the region of combustion chamber 828 that subsequent fuel injection occurs. This increases the rate of ignition and combustion of fuel subsequently injected as one or more patterns of stratified fuel into such oxygen-rich zone within combustion chamber 828.

In engines that have more than one intake valve similar to 827A (such as 827A2 not shown), a flow inducement injector 825 may be used to increase the flow of air or oxygen from conduit 838 when intake valve 827A is open and another flow inducement injector 825A2 (not shown) may be used to increase the flow of fuel from conduit 836 into combustion chamber 828 when intake valve 827A2 is opened. This increases the rate of ignition and combustion of fuel subsequently injected as one or more patterns of stratified fuel into such improved density constituents within combustion chamber 828.

Similarly exhaust valve 827B can be opened before, at or after TDC to manifold conduit 838B to deliver compressed gas such as fuel, air, or combustion gases to valve 806 and thus to tank 871 or another similar tank and/or through valve 808 to intensifier 870 for regenerative braking purposes. In instances that two exhaust valves are present one or both exhaust valves may be utilized for such regenerative braking.

Representative benefits of TCR processes such as shown in Equation 16 include:
1) Conversion of low grade waste energy to chemical and pressure potential energy.
2) On-site disposal of soluble, suspended or emulsified wastes that ordinarily are lost through sewage or garbage disposal practices for pollution reduction and cost savings.
3) Substantial pressurization is achieved by conversion of one mole of liquid such as methanol and one mole of liquid water and one mole of solid carbon to five moles of self-pressurized gas including two moles of carbon monoxide that is separated from three moles of increased-pressure hot hydrogen.
4) Production of hydrogen allows beneficial injection after TDC to produce work by expansion and J-T expansive heating of such pressurized hydrogen along with hydrogen accelerated combustion.
5) Production of positive and negative J-T expansion substances for expansive cooling before TDC and expansive heating at or after TDC to further improve BMEP.
6) Corona susceptibility agents such as ionized oxygen, oxides of nitrogen, hydrogen, heated hydrogen, argon and other more easily ionized substances provide improvements in corona ignition efficiency including capability for operation at high compression pressures. This allows recycling and re-purposing of engines that range in compression pressure from previous relatively low compression operation with spark ignition to very high compression and/or high pressure supercharged diesel engines.

Figure 7C:
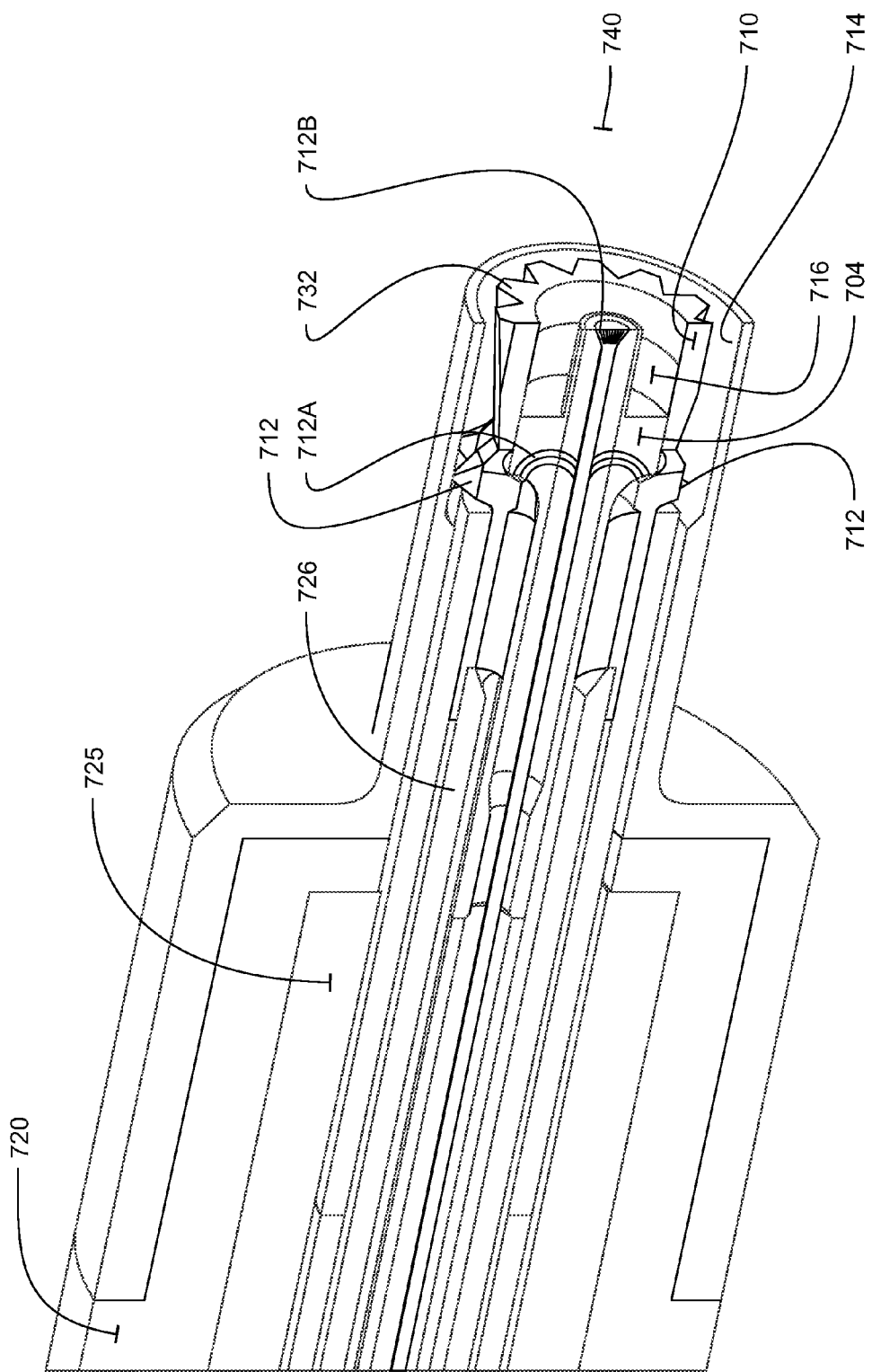
FIG. 7C is an enlarged partial cross-sectional view of the injector shown in FIGS. 7A and 7B.

Accordingly in addition to delivering 144% more combustion energy, the separated pressurized and cooled carbon monoxide can be delivered by conduit 661 and/or through fitting 732-734 and injected by embodiment 700 as shown in FIGS. 7A, 7B and 7C or in FIGS. 7D and 7E before TDC as an expansive coolant to reduce the work of compression. High-pressure hot or counter-current cooled hydrogen (e.g. to preheat methanol feed stock) delivered through conduit 664 can be injected at or after TDC to considerably increase the BMEP compared to methanol combustion. Very rapid selection of gas sources such as cool CO or $H_2$ is provided by valve assembly 780, which is activated by a suitable piezoelectric component assembly 782 to provide for amplification of the motion of shuttle valve in assembly 792 to switch between gases supplied through conduits 661 and 664.

FIGS. 7D and 7E show embodiment 750 for combined fuel injection and ignition operations. Embodiment 750 shows a valve operator such as a pneumatic, hydraulic, electromagnetic or piezoelectric assembly 752 that activates a suitable inward or outward opening fuel control valve 754 to provide cool fluid flow from fitting 756 or insulated hot fluid flow from fitting 758 to conduit 760 for delivery of one or more penetration patterns 780A-780E into combustion chamber 828 through electrode assembly in zone 772. One or more voltage transformer coils 722A-R can be located at locations on sleeve 701 or 768 to provide high voltage charging of one or more coaxial capacitors 766 to provide one or more nanosecond corona discharges into adaptively optimized air utilization patterns 780A-780E to accelerate the initiation and completion of combustion and stratified heat production in combustion chamber 740 or 828.

In a representative mode of operation, hydrogen or hot, high pressure stratified hydrogen patterns serves as one or more susceptor patterns for highly efficient corona discharge ignition of one or more bursts 780A-780E. Such corona discharges into one or more susceptor patterns reduce the electrical energy requirements and improve the ignition efficiency by as much as several orders of magnitude compared to compression ignition of diesel fuel.

Similar operation by additional units such as shown in FIGS. 7D and 7E provide for expansive cooling fluid injection from selection of connections 756A-756F to provide cooling of actuator 752 and/or transformer 748 and injection before TDC to improve BMEP of engine operation. As an example the majority of expansion cooling fluid flow may be through one or more units and hot fluids such as hydrogen may be delivered by other units to minimize heat losses.

Warm or high temperature capacitors located in annular space 766 can be made of suitable dielectric ceramics, glass ceramics, graphene arrays, etc., including embodiments that utilize aluminum oxynitride dielectrics for high power (as disclosed by Kevin R. Bray et al., of K Systems Corporation in the OSD/AF SBIR Phase II Program regarding Contract No. FA8650-C-2415) for thermally stable operations. Such proximate location of such high speed ignition capacitors assures spark free corona discharge into the susceptor patterns and prevents spark erosion of electrodes in zone 772, which is shown in greater detail in FIG. 7C including features 712 and 732. Other suitable susceptor agents such as oxygen that enters the annular space provided by electrode assembly 714 and 712-732 during compression are launched as one or more penetrations of stratified ion patterns. Activation of sufficient oxygen particles in such spaces can initially be accomplished by one or more applications of minimal electrical power using a circuit typical to types utilized by Tasers and thus minimize or eliminate spark erosion typical to spark plug operation. Such activated oxygen may precede injections one or more bursts of hydrogen to further define corona discharge for efficient ignition while minimizing or eliminating spark erosion.

Controller 106, 730 and/or 790 provides functions such as:
1) Control of an inertial two component armature or piezoelectric valve operator such as 752 and/or 764 including varying the applied voltage to compensate for thermal expansion and to provide fuel flow control in response to instrumentation 712A, 712B and/or crank-acceleration detection and/or piston velocity and position detection by fiber optic filaments within bundle 712B.
2) Fuel pattern control starting with valve 704 that can be multiply opened outward by the piezoelectric operator 702 or 764 to allow fuel flow through radial ports next to radial ionization edges or tips 712 for initiating very small currents between electrodes 710 and 714. These small currents suddenly reduce the resistance in the gap between electrode tips 712 and 714 and application of continued higher or lower voltage quickly causes production of large momentary currents that experience Lorentz thrust forces to accelerate and launch the currents of ions along with swept fuel into combustion chamber 740.
3) After departure of such ions and swept fuel from the electrode gap between 710 and 714 nanosecond applications of high voltage to electrode 710 efficiently produce corona ignition in the cono-form patterns of fuel and ions that have been accelerated and launched into the compressed air in chamber 740.
4) The included angle of the launched ions and swept fuel particles can be altered by embodiments that provide the electrode flow pathways such as splines including various straight and helical swirls, electro- or permanent magnet lens 716 within electrode 710, by laser or diode emitted UV patterns from one or more fiber optic filaments in bundle 712B and/or by the polarity of an E-field emitted by one or more antenna in filament bundle 712B.
5) In another mode of operation controller 108, 730 and/or 790 provides for oxidant such as air that enters the annular gap between electrode zones 712-710 and 714 to be ionized to produce activated oxidant particles such as electrically charged particles and/or radicals $O_3$, NOx, $OH^-$ etc., that are launched into combustion chamber 740 by Lorentz thrust forces and/or by fuel pressure upon opening of valve 704 and/or by combustion and thermal expansion of combustion gases produced upon fuel flow.

These control features provide much greater air utilization efficiency than can be provided by direct injection (DI) of diesel fuel and combustion induced by hot compressed air and allow very rapid adaptive adjustments of initiation and completion of combustion with greatly varying fuels particularly including mixtures of fuel feed stocks and TCR constituents.

Equation 17 summarizes the general processes for utilizing such forms of waste including cellulose as a carbon and/or hydrogen donor. In some embodiments the cellulose reactant is activated by treatment with a strong acid and/or ammonia and/or H-1, H-2 and/or H-3 heated steam that supplies $Heat_{17}$ as summarized by Equation 17.

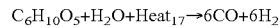

$$C_6H_{10}O_5 + H_2O + Heat_{17} \rightarrow 6CO + 6H_2 \qquad \text{Equation 17}$$

Equation 18 summarizes another embodiment for production of larger molecules of HCF compounds for ambient temperature and pressure storage of liquids that allow "net hydrogen" applications and one or more selections of various soluble or otherwise suspended carbon donors "dC".

As shown in exemplary Equation 18, carbon monoxide and hydrogen produced by processes similar to the reaction shown in Equation 17 can be used to synthesize various larger liquid HCF molecules such as illustrated by diethylether (DEE) dimethylether (DME), methanol and other alcohols along with a wide variety of other compounds including urea and formic acid.

$$CO + 2H_2 \rightarrow CH_3OH \text{(HCF Hydrogen Carrier Fuel)} \qquad \text{Equation 18}$$

Forming such larger compounds of hydrogen with higher viscosities insures against leakage that would be possible by tiny hydrogen molecules. In some embodiments "dC" substances further include leak sealants that provide swelling upon exposure to oxidizing or other triggering events at a leak interface. Illustratively an embodiment provides agent A as a coating on the inside or outside of a tank liner for the purpose of triggering a leak-sealing event if "dC" or a constituent of the liquid fuel contacts it. As an example, agent A could be an alcohol or water-activated adhesive that can be used to coat the outside and if an HCF includes water or an alcohol such as methanol and it comes into contact with coating substance A it triggers a sealing event. Illustratively methanol can solubilize and/or trigger thermosetting events of one or more latent reactants such as two or three part components of an epoxy preparation.

In other embodiments "dC" additives include substances that allow leaks to be detected at low concentration levels for early warning of incipient leaks. In other embodiments "dC" includes one or more substances that provide modification of ignition or combustion characteristics.

Equation 19 shows another process embodiment for converting carbon dioxide and hydrogen such as may be produced by reactions such as previously shown into a HCF such as methanol and water within which one or more "dC" substances are suspended, dissolved and/or emulsified.

$$CO_2 + 3H_2 + \text{``}dC\text{''} \rightarrow \text{HCF (Hydrogen Carrier Fuel)} \qquad \text{Equation 19}$$

Production of various liquids such as formic acid and soluble, suspended or emulsified "dC" reduces or overcomes the HCF energy-storage density deficit is shown as another illustrative example by Equation 20.

$$CO_2 + H_2 + \text{``}C\text{''} \rightarrow \text{HCOOH} + \text{``}dC\text{''} \qquad \text{Equation 20}$$

Such representative equations can be individual operations or combined in various permutations, to allow TCR and pressure production outcomes. A representative HCF ammonia or alcohol (e.g., another of numerous selected processes) for conversion of water and one or more carbon donor substances collectively symbolized as "dC" (e.g., fuel and/or leak sealant and/or leak detection and/or combustion modifier constituent and/or energy density improvement substance), and a suitable form of off-peak or renewable energy such as engine or vehicle waste heat (HEAT) into advantageously pressurized gaseous fuel constituents.

Illustrative forms of engine waste heat include regenerative heat transfers from engine coolant fluids such as anti-freeze and lubricating oil and/or exhaust gas sources. Illustrative forms of vehicle waste energy are produced by spring/shock-absorber motion and/or friction braking compared to the present systems for providing regenerative components to supplement or accomplish the same outcomes and supply regenerative energy to provide the beneficial reactions that have been shown. Thus embodiments that provide endothermic energy facilitate reactions to provide highly advantageous increases in the chemical and/or pressure energy potentials of hydrogen-characterized products compared to the original HCF.

In other words the hydrogen-characterized fuel products release more heat upon combustion than the feedstock reactants and deliver pressure potential energy to improve air-utilization efficiency, fuel economy, and engine performance. The embodiment of FIGS. 1, 4, 6A, 6B, and 7A-7E facilitate the delivery of hydrogen and/or hydrogen characterized products directly into the combustion chamber as high pressure stratified-charge gas pattern distributions that provide expansive work along with Joule-Thomson (J-T) expansive heating to contribute additional work, and then provide accelerated initiation and completion of combustion events within insulating oxidant to maximize work production and performance of the converted engine.

$$2NH_3 + HEAT_{21} \rightarrow N_2 + 3H_2 \qquad \text{Equation 21}$$

$$C_2H_5OH + 2H_2O + \text{``}C\text{''} + HEAT_{22} \rightarrow 3CO + 5H_2 \qquad \text{Equation 22}$$

$$2NH_3 + H_2O + \text{``}C\text{''} + HEAT_{23} \rightarrow N_2 + CO + 4H_2 \qquad \text{Equation 23}$$

Pressure produced by processes typical to the principles illustrated by Equations 21, 22, and 23 including solid- and/or liquid-to-gas phase changes and/or production of an increased number of moles such as shown in Equation 21 for 4 moles of gas production from 2 moles of liquid reactant or by Equation 22 for 8 moles of gas production from 3 or 4 moles of liquid solution reactants or by Equation 23 for 6 moles of gas production from 3 or 4 moles of liquid solution reactants. Such TCR pressurization can be utilized to increase the brake mean effective pressure (BMEP) of an engine by application of such pressure by direct injection of the products ($N_2 + 3H_2$ and/or $3CO + 5H_2$ and/or $N_2 + CO + 4H_2$) after top dead center (TDC) in converted two and/or four stroke piston engines and/or other internal combustion engines. Objectionable fumes such as ammonia may be stored in carbon-donor absorbents "C" to reduce or overcome such objections and such absorbents may be suspended in other liquid HCFs.

Suitable hydrogen and/or carbon donors "C" generally are provided with one or more constituents that perform specialized functions such as providing leak sealing functions, leak detection or participation in warning systems for incipient leaks, combustion modification and include activated carbon, carbon and other nano-structures that store hydrogen and/or hydrogen donors such as ammonia ($NH_3$), food wastes including fats, carbohydrates and proteins, and off-grade or contaminated dusts from grain storage operations, flower mills, and bakeries, along with wastes from dairy, brewery and ethanol plant operations etc.

An embodiment 150 is shown in FIG. 1A for enabling utilization of such liquid net-hydrogen carrier fuel embodiments in the world's population of about one billion existing vehicles. An existing vehicle tank 100 may be used or modified and refitted with new components to improve and re-purpose it for new capabilities and performances.

FIG. 1B shows a magnified view of a section of tank 100 in an embodiment that provides new features including tank liner coating 101, conformable liner 102, and an outside shield or barrier 110. An embodiment provides a protective coating 101 such as a self-curing or multi-part epoxy paint or varnish to the inside surfaces of the recycled and repurposed tank. Another suitable protective liner may include one or more coats of suitably prepared tank liner formula from sources such as Northern Factory Sales, Inc. of Willmar, Minn. (www.NorthernFactory.com). Such protective coatings can be prepared or formulated with solvents and/or surfactants to initially assure wetting of the surfaces that have gasoline or diesel fuel residues to greatly reduce the cost of re-purposing existing tanks for HCF storage operations.

In other embodiments, one or more suitable tank liner coatings and/or a preformed or conformable protective liner 102 made of a polymer selected for containment and compatibility characteristics such as perfluoroalkoxy (PFA) or poly-tetrafluoroethylene (PTFE), polyvinylidene fluoride (PVDF) or various elastomeric preparations such as a selected Viton formula or EPDM with suitable containment and compatibility properties is inserted through the fill port 120 and elastomerically, hydraulically and/or pneumatically inflated or otherwise erected to the form of the tank being re-purposed.

In some embodiments liner 102 includes a metal, polymer, or a composited rigid polymer neck portion to provide the fill cap attachment threads and sealing gasket along with connections including one or more electrical and/or fluid conduits 130 to one or more systems such as vapor pressure enhancing HCF delivery and/or energy addition. In some embodiments filler cap is suitably urged to open or close by rotation of matching screw threads, or it swings open and shut on a suitable hinge to seal against a lip of a filler tube that is adhered or otherwise sealingly fastened to or placed in the space of the original fill port. Illustratively, producing a relatively small pressure above the ambient barometric pressure in zone 132 with air or another substance such as carbon dioxide, nitrogen, methane, ethane, propane, or butane and/or by cyclic thermal energy-conversion pressurization devices such as mechanical pumps 128 provide delivery of HCF liquid. Such HCF delivery may be through pickup and filter conduit 130 to the selected TCR reactor circuit through valve 644 (see FIG. 6A) as controlled by suitable electronic controller 655. Pickup and/or filter conduit 130 may include multiple locations for fluid flow to or through pump 128 also shown schematically as 640 (see FIG. 6A) with filter conduit 630 for purposes of allowing higher availability of the liquid fuel inventory as the tank is emptied including operation at virtually all terrain topographies and angles of propulsive thrust or at rest encountered by moving vehicles including aircraft and marine applications.

At a suitable time such as in preparation for assembly, the balloon-like bladder 102 is activated or coated on the outside with an adhesive that is activated to bond the bladder to the inside of tank 100 after a certain time in pressurized contact with or without UV or heat addition against tank 100. In some embodiments such pressurized contact is maintained by inflating the balloon bladder with a suitable gas such as heated nitrogen or air to activate or complete the bonding process.

Another embodiment of recycled and/or re-purposed gasoline, diesel or jet fuel tanks is produced by placing one or more weep ports such as 104A, 104B, 104C, 104D, 104E, 104F, 104G, etc., to facilitate collection and drainage of any fuel that escapes from the protective coating and/or inserted tank liner. Weep ports such as 104 may be of any suitable general shape such as the diamond shape 200 of FIG. 2 including attachment or adhesive zone 204 and weep zone 206 and/or incorporate features of embodiment 300 shown in FIG. 3.

Circular embodiment 300 provides a composite assembly 302 that is attached to the converted tank wall by a suitable adhesive such as a high strength construction adhesive in zone 304 surrounding zone 306 and certain embodiments provide re-enforcement such as high strength metal, polymer, glass, or carbon fibers 208 or 308 as shown along with a permeable weep zone 306. Suitable adhesives for use in annular zone 304 include fuel-grade selections available from Master Bond, Inc. of Hackensack, N.J. (www.MasterBond.com).

In some instances the weep zone of sampling ports include or deliver samples of leaked substance to early detection and/or warning instrumentation 108 to detect targeted substances such as an alcohol, water, a signal additive, or other substances including substances such as formic acid disclosed herein. Suitable detector 108 may operate according to the principles utilized by detectors from various sources including options shown as website (Seeedstudio.com).

Illustratively an embodiment includes a fuel substance detector 108 including indication of an oxygenated substance such as a fuel constituent (e.g. an alcohol, DME, DEE, MTBE, formic acid, water etc.). In some embodiments detector 108 includes an interrogation node for wired or wireless communication to controller 106. Controller 106 is programmed to monitor the leak rate and/or trend and to provide for appropriate actions that range from preventative maintenance scheduling to emergency procedures such as a warning to park and/or shut down in a fail-safe routine such as immediately or within a few minutes. Barrier membrane 110 encases the tank assembly to provide for collection and venting to a suitable disposal of any leaked fuel such as through valve 126 to carbon canister 116 or in case of larger flow rates for delivery through valve 126 to an ignition and burn port 112 in the exhaust system 114 of the host engine and/or vehicle.

Barrier membrane 110 may be made of UV protection rated polymer such as polyvinyl fluoride (PVF), polyvinylidene fluoride or other suitable material and/or may be composited with scratch resistant diamond-like-carbon (DLC) coating and/or penetration protecting layers of polymers such as nylon, urethane or hollow nanofiber reinforced composite with materials such as polyamide-imide, polyimide, or Kevlar. In other embodiments barrier material 110 may be a suitable thermopolymer to provide gas containment that is protected from U.V. and other weathering agents by a suitable roof rated coating. Illustratively membrane 110 may be polymer of suitable molecular weight made of ethylene propylene diene monomer (EPDM) with extra protection by a suitable overcoat such as white EPDM supplied by sources such as EPDM Coatings, LLC of Shelton, Conn. (www.epdmcoatings.com).

Figure 6B:
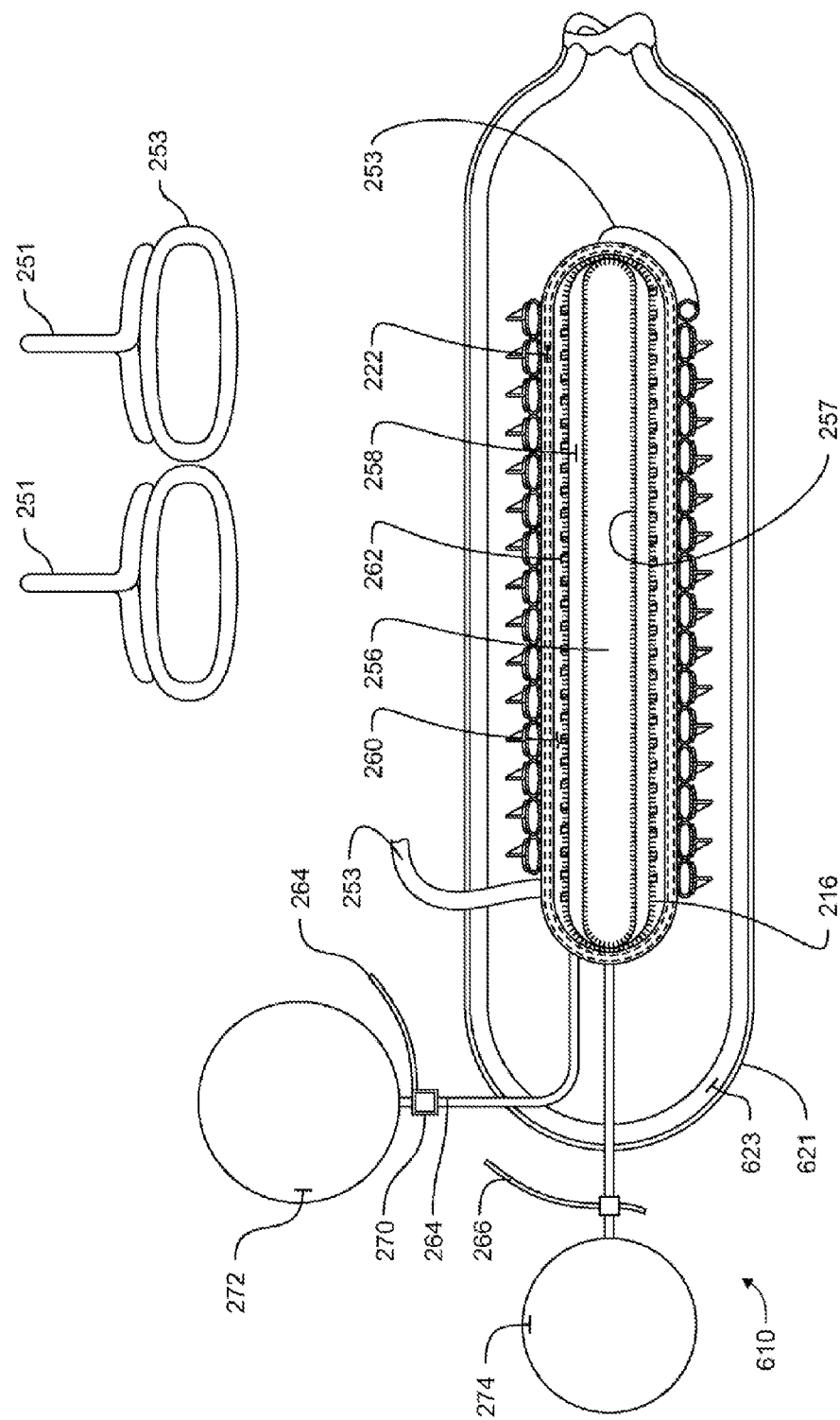
FIG. 6B illustrates a separation and pressurization device according to a representative embodiment.

In ordinary operation, any fumes or vapors that may occasionally need to be burped from tank assembly 150 are vented from fill cap assembly 120 through connection 122 to storage in carbon canister 116 for accumulation of such fuel values until the engine is operated in a manner that optimizes delivery to the engine or to another useful purpose such as to a turbocharger and/or to the TCR system. Delivery to the engine may be at a relatively low fuel rate into unthrottled air during the intake stroke to produce a mixture that is typically too lean to combust before being rapidly activated and combusted by direct injection and ignition of hydrogen-characterized fuel that is delivered by a device selected from types such as shown in FIGS. 6A and 6B to optimize performances with specific engine types and duty cycles.

In certain embodiments tank 638 (see FIG. 6A) may be a repurposed tank that was originally designed for storage of compressed natural gas or hydrogen. Certain embodiments utilize a thermoset or thermoplastic polymer liner such as a polyolefin or fluoropolymer that is rated for chemical compatibility with net hydrogen fuels including fuel alcohols, urea, ammonia, nitromethane, formic acid and various pressuring expansive agents. Fluoropolymers such as perfluoroalkoxy (PFA), Tetrafluoroethylene (PTFE) provide suitable chemical resistance at temperatures up to about 130° C. (260° F.) and can be wrapped with reinforcing filaments such as glass, ceramic, or carbon to form a composite tank assembly that is rated for storage of fuels disclosed herein at pressures of about 10,000 PSI.

In other instances a pressurizing expansion gas heater of a suitable configuration such as depicted by 690A in FIG. 6C or 690B in FIG. 6D is provided within a ceramic or high temperature polymer insulator tube 692 to repurpose an existing tank such as a 10,000 PSI hydrogen tank made by Quantum Technologies of Lake Forest, Calif. (www.qtww.com). Ceramic, polymer, or composite tube 692 provides insulation and protection to limit the temperature within the re-purposed tank such as a composite tank. Heater element 694 may be a tubular circuit component for heat transfer fluids such as engine coolant, gas or liquid heat exchange fluids, or an electrical resistance or inductive heating component. One or more connections to and from heating element 694 may be provided through a wall of tube 692 as may be one or more pressure and/or temperature sensors 698 such as a thermistor or thermocouple to enable controller 655 to control the pressure and temperature of the various pressurization and re-charge operations that are performed. In some instances the pressurizing gas expansion heater is a more or less straight tube assembly 690A and in other instances it is a curvilinear assembly 690B to allow liquid to enter at one or more ends and vapor or gas to exit at elevated ends or ports.

Such temperature, pressure and chemical compatibility rated tanks 638 enable a pressurizing expander mixture 659 such as hydrogen and a change of phase agent such as ammonia, methanol, ethanol, butanol, propane, or butane to pressurize the delivery of net hydrogen liquid fuel through filter tube 630 and pump or valve 640. Heat addition such as H-1, H-2 and/or H-3 is utilized at controlled times (i.e. from 604, 648, 653, or 658) to vaporize the pressurizing expander such as butane and provide pressurized delivery of the net-hydrogen liquid fuel. At times the engine is off the butane portion of the pressurizing expander cools and condenses to sufficiently reduce the tank pressure to allow hydrogen (i.e. from the process of Equations 1, 5, 6, 7 or 8) to be recharged into tank 638 at lower, equal or higher pressure than required for delivery of the liquid fuel. Such hydrogen or hydrogen-characterized gas blend can be used for clean start-ups of cold engines. Subsequently upon becoming available as the engine warms up the pressurizing expander is heated to produce suitable phase change to pressurize the tank for delivery of the liquid fuel contents.

As shown in FIG. 6A thermochemical regeneration by embodiment 600 provides transfer of heat or other forms of energy to drive endothermic processes that produce reaction products that provide hydrogen-characterized combustion benefits including far faster combustion and provide greater heat production upon combustion than the feedstock HCF. In addition the hydrogen can be pressurized by the reaction and/or by galvanic separation across a proton membrane 258 as shown in FIG. 6B and can be directly injected after TDC for work production by expansion of such pressurized hydrogen along with expansive heat generation to produce additional work and subsequently combusted to provide much greater work and performance.

Suitable proton transport membranes include Perovskite-like ceramics, non-stoichiometric spinels, oxynitride ceramics, and/or composites with radially packed nanotubes or selectively oriented graphene or graphite plate tube 408 within canister 402 as shown in partial section view of embodiment 400 of FIG. 4. In operation the embodiments 400 or 610 of FIGS. 4 and 6B provide for hydrogen production reactions on or within composited anodes 422 or 257 around accumulator spaces 418 or 256. Hydrogen enters proton transport nanotubes or membranes 408 or 258 and is delivered by pressure and/or voltage gradient to cathode 424 or 216.

Considerable improvement of the strength and durability of the hydrogen separation and pressurization assembly is provided by forming or over-wrapping cathode 424 with high strength fibers such as graphite, sapphire, silicon carbide or other high strength and conductive composite selections 426 as shown in FIG. 4 or 262 as shown in FIG. 6B.

Voltage applied between anode 422 and 424 or between 257 and 216 is controlled to produce the desired rate of proton delivery and hydrogen pressurization of annular accumulator 406 or 260 along with resistive heating of the composite membrane assemblies to provide or participate in delivery of the endothermic heat requirement for the hydrogen production reactions. Such electromotive hydrogen pressurization of annular accumulator 406 or 260 provides compressive loading of the membrane assembly for additional structural stability and strength.

In operation, fuel such as a net hydrogen fuel alcohol preparation 414 delivered through annular passageway between canister 402 and inner tube or containment canister 401-404 is heated by suitable heat transfers from engine coolant (H-1), supercharger exchange, exhaust gases (H-2), and/or other sources such as regenerative energy (H-3) including conductive or radiative heat additions by resistive or inductive transfer from component 412 and is delivered to accumulator 410 within concentric anode 422. Hot hydrogen 416 produced at anode 424 and separated by transport through proton membrane 408 can be pressurized by application of voltage between concentric electrodes 422 and 424. Co-produced gases such as carbon monoxide 420 are routed to heat exchangers or storage in 274 and/or subsystems that synthesize chemicals, polymers or for use as a fuel in a fuel cell.

Other components of embodiment 600, shown in FIG. 6A, include re-purposed tank assembly with features disclosed regarding embodiments related to system 638 for storing liquid HCFs at ambient temperature and pressure, liquid pump 640 for efficient pressurization of liquid HCF feed stock to be preheated by engine coolant circulated through connection 648 to 650. Fuel routed through valve 644 is heated by counter current circulation of engine coolant through conduit 148 to 650. Further heating of HCF is from the exhaust gas stream 634 that flows countercurrent to 604 in exhaust system 620. Heated HCF fluid is then connected to conduit 253 with extended surface such as reinforcing fin 251 for further heat gain in the exhaust manifold 623 as shown in embodiment 600 and by similar arrangements in the embodiment 610 of FIG. 6B in which hot exhaust gases from the engine heat HCF fluid and in some instances another fluid such as steam that is delivered by conduit 652 to port 677 or to port 253 that enters manifold 623 through conduit 253 after which HCF enters accumulator 256 for reaction on or near anode 257 to produce hydrogen that is delivered across proton exchange membrane 258 to cathode 216 by pressure gradient and/or galvanic impetus to develop higher pressure diatomic hydrogen in accumulator 260 within reinforced canister 222. Additional heat may be added by inductive or resistive heating from resistive filaments in element 262 which utilizes power including delivery from the host vehicle's regenerative suspension or braking system or from grid or other off peak sources.

Gases remaining within accumulator zone 256 such as methane, nitrogen, oxides of carbon (i.e. carbon monoxide or carbon dioxide) are cooled by counter current heat exchange with ambient temperature HCF in conduit 658 from port connection 266 for direct injection before TDC through port 638A of embodiment 665 of FIG. 6A to cool the air in the compression cycle and reduce compressive work for producing higher BMEP.

As further shown in FIGS. 6A and 6B hot hydrogen from accumulator 260 can be delivered directly through valve 270 and insulated conduit 264 to an injector assembly such as 665 through port 638B for direct hot condition injection into the combustion chamber at or after TDC to produce expansive heating and increased BMEP or hydrogen can be stored in accumulator 272 for clean cold startup of engine 632 without undesirable emissions.

It is advantageous to directly inject cooled fluids such as methane, nitrogen, carbon monoxide, or carbon dioxide, that provide further cooling upon expansion before TDC and at or after TDC to directly inject hot hydrogen to produce further heating upon expansion to increase BMEP and accelerate the beginning and completion of combustion as a stratified charge.

FIG. 7A is a cross-sectional side view of an integrated injector/igniter 700 ("injector 700") configured in accordance with yet another embodiment of the disclosure. As explained in detail below, the injector 700 is particularly suited for injecting one or more fluids such as pressurized carbon monoxide to produce Joule-Thomson (J-T) expansive cooling before TDC by delivery from a suitable source through fitting 661 and J-T expansive heating by delivery of hydrogen from a suitable source at or after TDC.

Injector 700 includes a body 701, a valve actuator 702, fluid inlets 732, 661 and/or 664, a valve assembly that may include instrumentation filaments 712A and/or 712B, voltage transformer 722A-722R, capacitor 725, and ion generating electrodes 712, 732 and 714. The nozzle portion 608 is configured to extend into an injection port in a cylinder head of a piston engine. Injector 600 includes one or more base assemblies 629 (identified individually as a first base assembly 629a and a second base assembly 629b) configured to receive fuel into the base portion 606 of the injector 600 and selectively meter the fuel to the nozzle portion 608.

More specifically, each base assembly 629 includes a valve operator assembly 625 configured to actuate a corresponding poppet or base valve 654-656. The valve operator assembly 625 includes a force generator 626 (e.g., an electric, electromagnetic, magnetic, piezoelectric, etc. force generator) that induces movement of a driver 620 to exert force to open valve 656 from seat 658 and provide cooling fuel flow 626 from a pressurized source connected to fitting 638a, through electromagnetic turns 625 and circuit 657a and/or 657b to annular space 616 and then past seat 670 and radially opening valves 669 into annular space between electrodes 686 and 685 for direct injection into the combustion chamber of the host engine such as 132. The force generator 626 can also be operably coupled to a corresponding controller or processor 622 (identified individually a first controller 622a and a second controller 622b) to selectively pulse or actuate the force generator 626, for example, in response to one or more combustion chamber conditions or other engine parameters.

One or more base assembly units 629 provide electric solenoid and/or transformer coils 625 to produce or boost suitable voltage production to initiate a current between electrode gaps 681 and 685 after which a much larger current is applied to thrust and launch a sufficient ion population into the combustion chamber to assure rapid initiation and completion of stratified charge combustion and heat release. Corona discharge into the combustion chamber follows sufficiently short application of ionizing voltage through insulated contact 627 for discharge in the pattern provided by field antenna features around the core of fiber optic assembly 617.

The core assembly 613 includes a core insulator 616 coaxially disposed over an ignition member or conductor 614. The core assembly 613 also includes a cylindrical or tubular enclosure member 688 that at least partially defines the fuel flow channel 624 with the ignition insulator 616. The core assembly 613 extends through an insulative body 642 that may incorporate one or more capacitors within the body 602. The ignition conductor 614 is operably coupled to an ignition terminal 627 to supply an ignition voltage to the ignition electrode 684 having one or more electrode features 681, 684, 686.

The ignition electrodes 681 and 684 generate current and ignition events with a second electrode 685, which can be a conductive portion of the distal end of the nozzle portion 608. The ignition insulator 616 includes an enlarged end portion 683 having a greater cross-sectional dimension (e.g., a greater cross-sectional diameter) adjacent to the ignition electrode 684.

The enlarged end portion 683 of the ignition insulator 616 is configured to contact a flow control valve 661 carried by the nozzle portion 608. The flow valve 661 is a radially expanding valve that includes a first or stationary end portion 668 that is anchored, adhered, or otherwise coupled to the enclosure member 688 at a location downstream from the enlarged end portion 683 of the ignition insulator 616. For example, the first end portion 668 can be swaged or adhered to an outer surface of the enclosure member 688 with a suitable adhesive, thermopolymer, thermosetting compound, or other suitable adhesive.

The flow valve 661 further includes a second deformable or movable end portion 670 opposite the stationary end portion 668. The movable end portion 670 contacts the enlarged end portion 683 of the ignition insulator 682 and is configured to at least partially radially expand, enlarge, or otherwise deform to allow fuel to exit the nozzle portion 608 of the injector 600. More specifically, the enclosure member 688 includes multiple fuel exit ports 669 adjacent to the movable end portion 670 of the flow valve 666.

During operation, fuel is introduced into the base assembly 629 via the fuel inlet fitting 638. The fuel flows through the force generator 626 and the driver 622 to arrive at the base valve head 656. When the valve operator assembly 625 moves the valve 654 to the open position to space the base valve head 656 apart from the valve seat 658, the fuel flows past the base valve head 656 and into the fuel connecting conduits 657. From fuel connecting conduits 657, the pressurized fuel flows into the fuel flow channel 624.

In one embodiment, the pressure of the fuel in the fuel flow channel 624 is sufficient to at least partially radially expand or otherwise deform the movable end portion 670 of the flow valve 661 to allow the fuel to flow past the enlarged end portion 683 of the ignition insulator 680. In other embodiments, however, one or more actuators, drivers, selective biasing members, or other suitable force generators can at least partially radially expand or otherwise deform the movable end portion 670 of the flow valve 661. As the flow valve 661 selectively dispenses the fuel from the fuel exit ports 669, the fuel flows past the one or more ignition features 686 that can generate an ignition event to ignite and inject the fuel into the combustion chamber.

In certain embodiments, each base assembly 629, as well as other fuel flow controllers, can be configured to perform: 1) control of fuel flow by opening any of the valve assemblies, and 2) production of ionizing voltage upon completion of the valve opening function. To achieve both of these functions, in certain embodiments, for example, each force generator 626 can be a piezoelectric actuator that is operated with a voltage control system according to controller 622a and/or 622b that utilizes one or more portions of voltage transformer 625 including a first or primary winding and a secondary winding. The secondary winding can include more turns than the first winding. Each winding can also include one or more layers of insulation (e.g., varnish or other suitable insulators), however the secondary winding may be insulated with a coating that provides higher dielectric strength such as boron nitride or low-conductivity forms of carbon or include more insulating layers than the first winding.

The voltage generator 626 can also be electrically coupled to the conductor 614. By winding a force generator 626 or solenoid as a transformer with a primary winding and a secondary winding of many more turns, the primary can carry high current upon application of voltage to produce pull or otherwise induce movement of the driver 620. Upon opening the relay to the primary winding, the driver 620 is actuated along with production of a higher voltage by one or more secondary windings.

Higher voltages of one or more secondary windings can be applied to the plasma generation ignition event by providing the initial ionization after which relatively lower voltage discharge of a suitable source such as one or more capacitors that have been charged with any suitable source (including energy harvested from the combustion chamber by photovoltaic, thermoelectric, and piezoelectric generators) continues to supply ionizing current and thrust of fuel into the combustion chamber.

FIGS. 7A, 7B, 7C, and 7D show another fuel injection and ignition embodiment 700 that facilitates injection of cool fluids that provide further expansive cooling before TDC and hot hydrogen to provide expansive heating at or after TDC. In other embodiments hydrogen is injected and rapidly combusted to stimulate much faster and assured completion of combustion of other fuel constituents including pollutants and/or coproduced fuel values such as depicted by Equations 5, 6, 7, 8, 9 and 16. In such instances stratified charge hydrogen ignition and combustion before, at, or after TDC provides improvements in engine performance and efficiency along with reducing or eliminating objectionable exhaust emissions by assuring rapid completion of oxidation of homogeneous and/or stratified presence of pollutants and other fuel constituents. This allows atmospheric pollutants and/or other fuel values including lower pressure fuel constituents to be rapidly ignited and combusted.

In instances that natural gas or methane produced from stranded, remote, and other inconvenient sources such as decaying permafrost, oceanic clathrates, swamps, new petroleum production wells, and landfills the first priority provides for production of carbon and suitable HCFs as summarized in Equations 1, 26, 27 and 28 and in instances before opportunities are developed for production of durable goods from such carbon, the process of Equation 24 provides economical preparation of liquid fuel that can be taken to market in suitably re-purposed containers.

Depending upon consideration of aspects such as IR absorption, ozone destruction, and the time required for eventual conversion by oxidation to carbon dioxide and water vapor, methane is 20 to 70 times more harmful as a greenhouse gas per molecule than carbon dioxide. The partial oxidation process of Equation 24 overcomes the practice of venting or flaring such natural gas and methane by safely converting gaseous methane and/or other hydrocarbons to methanol and/or other liquid fuel constituents that are taken to useful applications in re-purposed containers.

$$CH_4 + 0.5O_2 \rightarrow CH_3OH \qquad \text{Equation 24}$$

Example 3 shows the process of producing pressurized air by an engine utilizing a suitable system to collect pressurized air from the combustion chamber of an engine such as one that operates on stratified charge combustion of hydrogen or hydrogen-characterized fuel. In the process of Example 3, air is compressed and separated into streams of oxygen and nitrogen. The separation process can pressurize the oxygen by utilization of galvanic impetus.

EXAMPLE 3

Liquid Hydrogen Carrier Fuel Production (Example 3)

STEP 1: Produce carbon and hydrogen by dissociation of $CH_4$.

STEP 2: Produce, separate and pressurize hydrogen by dissociation of $CH_4$ on the anode zone of a composite assembly including an anode, proton exchange membrane, and a cathode, in which a voltage gradient is established to provide proton transport and pressurization upon forming molecules of hydrogen in the cathode zone.

STEP 3: Separate pressurized air into nitrogen rich stream and oxygen rich stream.

STEP 4: React separated nitrogen with pressurized hydrogen to produce a liquid fuel such as ammonia.

EXAMPLE 4

Liquid Hydrogen Carrier Fuel Production Example

STEP 1: Pressurize air

STEP 2: Separate pressurized air into nitrogen rich stream and oxygen rich stream.

STEP 3: React oxygen from the oxygen rich stream with a hydrocarbon to produce a liquid fuel such as methanol.

Figure 5:
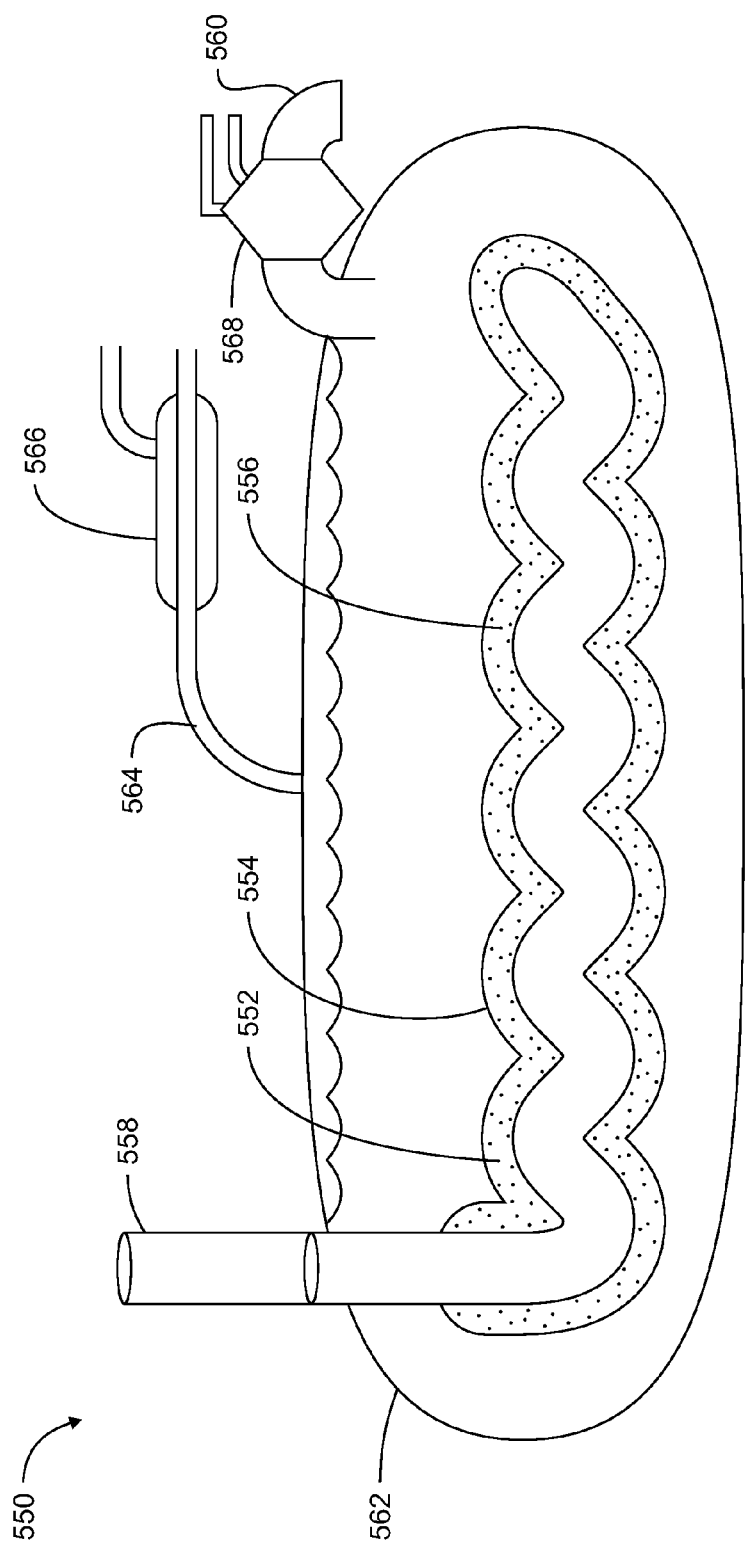
FIG. 5 is a sectional view of an anaerobic digester assembly according to a representative embodiment.

FIG. 5 shows a system 550 or anaerobic digestion of organic wastes. New anaerobic digestion outcomes are provided by adding selected carbon allotropes and structures 552 to the process mixtures. In some embodiments some or all of such carbon structure additions are provided in a pass through bag or permeable container 554 for purposes such as retaining enzymes on activated carbon surfaces to enhance the rate of digestion by process steps such as dehydrogenation and methanization.

In some embodiments, hydrogen produced by enzyme facilitated dehydrogenation of organic substances is absorbed and/or adsorbed or "sorbed" into activated carbon such as architectural construct nano-structures 556 including various nanotubes and graphene assemblies. Such hydrogen carriers can be extracted and utilized after more or less continuous filtration or as a result of recycling the process contents to comprise various "C" mixtures to provide benefits including increasing the energy density of the resulting liquid fuel for delivering hydrogen characterized products, pressurization upon forming hydrogen characterized fuels, and to generate new optical signatures in storage and in combustion for adaptive process control and optimization.

In operation, deoxygenated waste water and/or other digestible wastes are added through conduit 558 and processed by enhanced action of carbon structures 552 and/or 556 within container 562 to produce processed water that exits through conduit 560. Permeable container 554 may be utilized to present and facilitate the operations of structures 552 and/or 556. Gases such as methane and carbon dioxide are collected by extractor conduit 564 and may be separated by filter 566. Urea and electrolytes such as acetic, butyric, carbonic acids produce hydrogen and/or carbon dioxide by electrolysis in unit 568 and may be separated by a suitable system.

Equations 25 and 26 summarize operational steps of a process for production of larger HCF compound molecules for ambient temperature and pressure liquid fuel storage at hydrogen densities that are greater than highly pressurized or very cold cryogenic liquid hydrogen.

$$CO_2 + CH_4 + Heat_{25} \rightarrow 2CO + 2H_2 \qquad \text{Equation 25}$$

The products of Equation 25 can be supplemented with hydrogen from the dissociation of a suitable hydrogen donor such as shown in Equations 1 or 27 to provide two moles of hydrogen per mole of carbon monoxide for pressurization and efficient HCF production as summarized by Equation 26.

$$CO + 2H_2 \rightarrow CH_3OH \qquad \text{Equation 26}$$

In some embodiments, a high temperature electrolyzer or reversible fuel cell is utilized to produce hydrogen that is separated from hot steam as by a proton membrane 408 and/or 258 and/or by a complementary oxygen-ion membrane such as a zirconia solid solution. Hot separated oxygen and hydrogen may be cooled by countercurrent heat exchanges with water or steam to accelerate the electrolysis process and improve efficiency. Cooled supplies of pressurized hydrogen and oxygen are utilized in a cool fuel cell at times that electricity production is needed to produce higher voltage than required for high temperature electrolysis. Alternatively the operation in the fuel cell mode at lower temperature produces higher voltage than required for high temperature electrolysis mode.

A high temperature fuel cell or a heat engine can supply the amount of heat that endothermic reactions such as shown by Equation 1 require for production of hydrogen along with carbon for manufacturing durable goods. Essentially all of the heat ordinarily rejected to the atmosphere by the engine's coolant and exhaust gases is transferred to the hydrocarbon feedstock to greatly reduce or eliminate the amount of energy that conventional practices produce by combustion of a portion of feedstock fuel. Such cascaded utilization of fuel cell or engine waste heat by a relatively low cost engine subsystem greatly reduces the cost of HCF production.

As an example a hydrocarbon feedstock such as methane, a converted and re-purposed transportation engine can provide heat transfers from engine coolant and/or exhaust gases to supply the 74.9 kJ/mol shown in Equation 27. Considerable surplus heat from the engine coolant and exhaust gases are used to distill and separate water from the water-alcohol mixture shown by Equation 28.

Co-produced hydrogen can be pressurized to 83 Bar (1,220 PSI) or higher and supplied with sufficient heat content at 260° C. (500° F.) or higher from the cathode accumulator 260 or 406 to accelerate the exothermic reactions of Equations 28. Illustratively three moles of hydrogen is supplied at sufficiently higher temperature and pressure (i.e. up to 1,500° C. and 203 Bar or 2730° F. and 3,000 PSI) to heat one mole of carbon dioxide for improving the yield of reaction 28 including separation of the water from the alcohol by selective distillation or condensation to shift the reaction to the right.

$$CH_4 \rightarrow C + 2H_2 (\Delta H298K = 74.9 \text{ kJ/mol}) \quad \text{Equation 27}$$

$$CO_2 + 3H_2 \rightarrow CH_3OH + H_2O (\Delta H298K = -49.7 \text{ kJ/mol}) \quad \text{Equation 28}$$

The exothermic heat from Equation 28 can in part provide the endothermic heat requirement of Equation 27 to reduce the net energy requirement. Such heat along with the surplus heat from the engine coolant and exhaust gases provides very low energy cost for production of liquid HCF (such as methanol, ethanol, propanol, butanol, DME, DEE, and various fuel acids etc.)

The carbon can be produced in various suitable forms for applications ranging from stabilizing polymers such as rubber for tires to diamond like (DLC) coatings for far more weather and UV resistant curtain wall, roofing, and siding products; carbon fiber for reinforcing composited products that are lighter than aluminum and stronger than steel; and electronic components that provide significant improvements compared to conventional materials. The reactor system of FIG. 4 or 6B can precipitate carbon for producing such goods. Assuming the feedstock is renewable methane or natural gas at $3.00/MBTU, carbon suitable for such applications can be profitably produced at less than $0.40/lb. Hydrogen that is co-produced is reacted with carbon dioxide from a concentrated source to provide a suitable net-hydrogen HCF such as methanol at less than $0.60 per diesel gallon equivalent.

Similarly advantageous thermodynamics are provided for production of ammonia and/or urea for use as fuels and fertilizers provided by the relatively low capital cost of re-cycled and re-purposed engines that are equipped with such product synthesizers. This allows agricultural enterprises to earn greater profits by improved crop yields and production for nearby municipal markets of net hydrogen HCFs from farm wastes. Regenerative, off peak and/or surplus electrical energy "EE" can be utilized to electrolyze steam as shown by Equation 29, in which engine coolant and/or exhaust gases can substantially provide $HEAT_{29}$ to reduce the amount of electrical energy required. Further improvement in the yield of oxygen and hydrogen is provided by separation of such products by transport across an oxygen ion and/or proton exchange membrane as shown in embodiment 258 of FIG. 6B or 408 of FIG. 4.

$$HEAT_{29} + H_2O + EE \rightarrow 0.5O_2 + H_2 \quad \text{Equation 29}$$

Hot hydrogen produced by Equations such as 27 and 29 can be galvanically pressurized by embodiment 610 for injection after TDC for greater BMEP, faster initiation and completion of combustion for higher fuel efficiency and clean emissions. The host engine or fuel cell can also provide such pressurization for production of densely stored hydrogen as a compound such as $CH_3OH$, $HCOOH$, $CH_3OCH_3$, $NH_3$ etc.

In another embodiment hot carbon from processes such as Equation 27 is utilized in a high temperature fuel cell to produce electricity at a much higher efficiency than required by operation of a heat engine to drive an electrical generator to charge a lead-acid or lithium ion battery. Further benefits are provided by utilizing such higher efficiency carbon fuel cell electricity to drive loads such as air-conditioning, lighting, windshield wipers, power windows and seats. The host engine thus provides improved performance and the combined or hybrid fuel efficiency is greatly improved along with vehicle range.

Cold engine start-up alternatives include utilization of a HCF such as methanol which can be injected before, at or after TDC in one or more injections and combusted to produce sufficiently warm engine and hot exhaust gases to operate on optimized combustion regimes and/or carbon fuel cell systems previously disclosed.

An embodiment for serving existing U.S. electricity markets provides capacity of about 4,200,000,000 Megawatt hours per year by about 20,000,000 recycled engines that are converted to net hydrogen operation to power electricity generators (4,200,000,000, MegaWattHours (25,000 W)(8,760 hrs/year)=19.2 million GenSets). Production of electricity at an average of about 25 KW per engine-generator set would supply the U.S. market. Twenty million recycled engines represent less than 8% of the registered engine-powered vehicles operating in the U.S. Engines could be recycled at the rate of 1 or 2% of U.S. fleet per year to double the U.S. energy utilization efficiency and supply the U.S. electricity capacity in less than 10 years and do so with far greater national energy security and less infrastructure maintenance including power grid systems now needing improvements.

Heat provided from engine coolant and exhaust gas transfers will produce carbon and hydrogen by reactions such as shown in Equations 1 and 27. Liquid net hydrogen HCFs will be produced according to reactions typical to Equation 28 using carbon dioxide from the atmosphere particularly including preemptive collections from concentrated sources such as bakeries, breweries, calciners, and waste digestion plants. Supplemental energy produced by carbon-reinforced equipment that harnesses solar, wind, moving water, geothermal and other renewable resources can be utilized for increased rates of carbon and hydrogen production to meet market demands for less expensive net hydrogen HCF and carbon products that result in higher performance durable goods.

Another embodiment utilizes typical processes such as summarized by Equations 27 and 28 to provide HCF production of the U.S. liquid fuel demand of about 220 billion equivalent gallons. Co-production of carbon for durable goods and liquid HCF requires about 1 Kg or 2.2 lbs. of hydrogen per equivalent gallon of presently used gasoline and diesel fuels.

An embodiment that provides improved equipment utilization and high return on investment includes a re-purposed engine, one or more fuel cells, and a fuel tank that are operated to produce heat, electricity, HCF, carbon, and/or other values from air and pipeline deliveries of fuel such as methane from renewable or fossil origins. Illustratively a re-purposed vehicle with re-purposed components including engine, fuel cell, and fuel tank utilizes suitable deliveries of fuel such as from a subterranean storage and/or production strata, large portable delivery tank, barge, or pipeline to source fuel for dissociation of the fuel such as shown by Equation 1 to provide hot carbon and hydrogen. Low pressure fuel such as methane can be pressurized delivered through conduit 836 and/or 824, stored in a tank like 871, and/or routed to valve 810 by the embodiment 800 of FIG. 8 for increasing the heat transfers and rate of production of carbon and hydrogen by the process of Equation 1. Helium and other values can be separated from natural gas by a suitable process such as provided by separator 860 and in some embodiments include optional further pressurization by intensifier 870.

The hot separated carbon can be utilized by a fuel cell to efficiently produce electricity and/or to preheat incoming fuel, and/or as a feedstock for durable goods production such as a diamond-like coating for architectural products to overcome degradation by scratching and weathering. In various greenhouse glazing, roofing, and curtain wall embodiments such architectural products can provide gain of more energy every month than the one time combustion of all the constituents of such embodiments could produce.

In certain embodiments such carbon is produced to provide compact and stable chemical and/or thermal energy storage potentials. Table 1 shows the relative merit of such compact carbon energy storage. In addition to providing compact chemical energy potential, carbon has high specific heat and thermal conductivity, along with thermal stability through temperatures ranging from cryogenic to more than 2700° C. (5000° F.) for excellent thermal energy storage with the synergistic multifunction processes that have been disclosed.

Combustion chambers of the re-purposed engine can be utilized to compress air by the embodiment of FIG. 8 to provide separated inventories of nitrogen, oxygen, carbon dioxide, water, and the argon group. Such gas compression by re-purposed combustion chambers can be controlled by microprocessor 665 and/or 856 to add a certain portion of the gas that is compressed and leave the remaining portion for combustion with fuel that is added by a suitable system such as direct injection of hydrogen for stratified charge combustion advantages before, at or after TDC to continue engine operations.

Separated and pressurized hydrogen produced by an embodiment such as 610 can be utilized to fuel the re-purposed engine and/or a portion of such hydrogen can be utilized in a fuel cell to produce electricity and/or as a feedstock to produce a suitable HCF such as methanol as depicted by Equations 18, 19, or 20.

Carbon monoxide and/or carbon dioxide produced by the fuel cell using carbon fuel and/or carbon dioxide collected from other concentrated sources such as an aerobic or anaerobic waste water digester and/or food or beverage fermentation process and/or carbon dioxide separated from atmospheric air by the embodiment of FIG. 8 is combined with hydrogen to produce suitable liquid HCF that is stored in the re-purposed tank for use as a mobile vehicle fuel.

Operation of the re-purposed engine by direct injection by the device of FIG. 7A or 7D of high pressure hydrogen from the separation and/or pressurization device of FIG. 6B at or after TDC and utilization of carbon monoxide and/or carbon dioxide such as from the exhaust of the high efficiency fuel cell provides very low cost production of carbon and/or electricity and HCF. Storage of the HCF in the re-purposed tank of FIG. 1A allows mobile operation of the re-purposed vehicle to allow net hydrogen operation that minimizes or eliminates objectionable exhaust emissions.

In another embodiment a repurposed engine 600 that drives a generator in a "GenSet" is provided for purposes of producing variable amounts of electricity, carbon (i.e. for durable goods production) hydrogen and HCF selections depending upon market demand for such values. Illustratively a carbon and hydrogen donor (CxHy) such as methane, ethane, propane, butane, or natural gas is anaerobically dissociated by heat additions such as H-1, H-2, and/or H-3 (as electric resistance or inductance heat generation), and/or by H-4 provided by combustion of a portion of the carbon donor substance and/or the hydrogen and/or the carbon monoxide 420 produced by processes such as 400 and/or stored in accumulator 274 in which the feedstock is a hydrogen and carbon donor. In some instances it is highly beneficial to utilize hot exhaust gas as the oxidant for such H-4 production in which such hot exhaust gas is produced by surplus air operation of engine 600. Selected portions of the remaining hydrogen and/or remaining carbon donor may be combusted in the GenSet engine 600. A variable portion of the dissociated hydrogen is reacted with nitrogen and/or carbon dioxide and/or carbon monoxide that may be produced by the Boudouard shift of carbon dioxide to produce a suitable liquid HCF such as a fuel alcohol, DME, DEE, ammonia, urea, acetic or formic acid. Such HCF is then distributed by pipelines or loaded into suitable tanks for distribution by rail, truck or barge to refueling stations for mobile equipment.

Process systems for H-4 heat generation include combustion of the selected fuel substance such as CH4, CO, and/or H2 with oxygen, air or oxidizing exhaust gas or oxygen or air that has been preheated by H-2 in a separated space such as a tube within a CxHy dissociation and carbon collection tube such as within space 418 or 623 and or by partial combustion in the space that such dissociation occurs. In some instances carbon dioxide is preemptively collected from a suitable source and may be reacted with a carbon donor CxHy such as methane to produce carbon monoxide as illustratively shown by Equation 30.

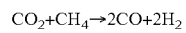
$$CO_2 + CH_4 \rightarrow 2CO + 2H_2 \qquad \text{Equation 30}$$

Figure 9:
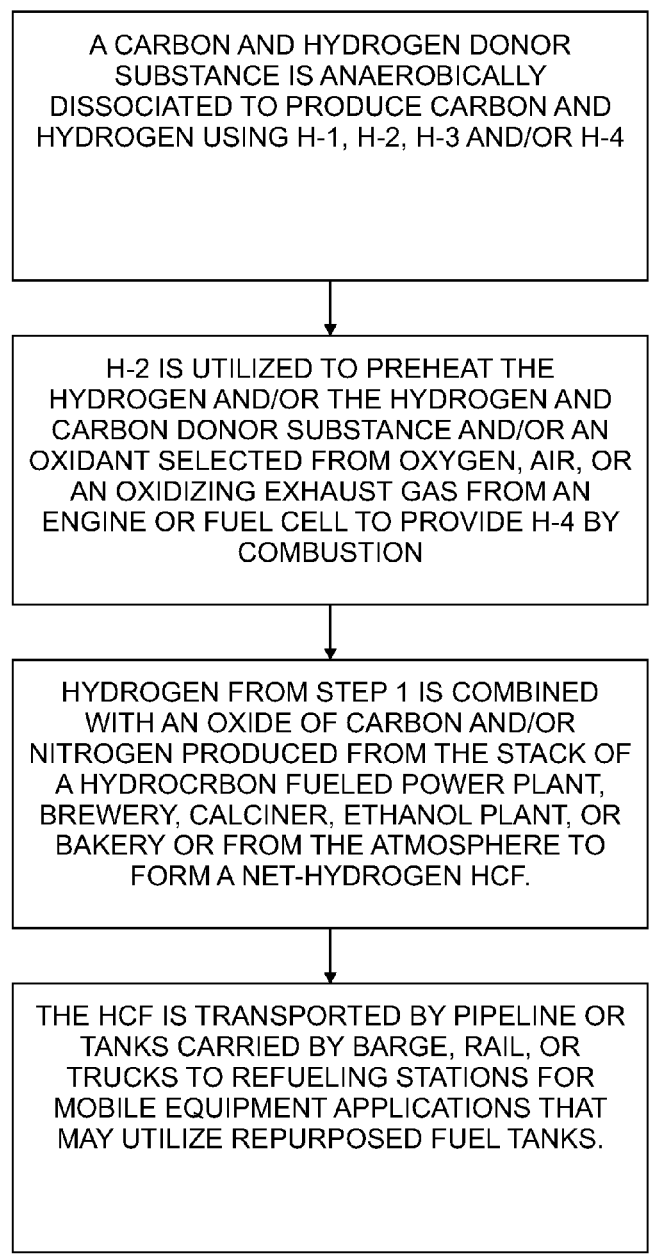
FIG. 9 depicts a process of a representative embodiment.

FIG. 9 depicts such operations in which carbon is collected by processes such as summarized by Equation 1, in which a carbon and hydrogen donor is preheated by H-1, H-2, H-3 and/or H-4 and the hydrogen is utilized in a GenSet engine to produce electricity, carbon, and HCF.

Methane concentration in the global atmosphere has more than doubled during the Industrial Revolution. A molecule of methane produces twenty to seventy times greater greenhouse warming and harmful stratospheric ozone destruction compared to a molecule of carbon dioxide. Increasingly large amounts of methane are released by erosion of soils that contain organic substances and from landfills, farm wastes, forest residues, and the fossil fuel industry. Much larger releases of methane are threatened by further greenhouse warming of vast permafrost and ocean bottom deposits of methane hydrates as ocean currents are modified.

Thermal dissociation of hydrocarbons ($C_xH_y$) such as methane to produce carbon and hydrogen provides attractive economic development opportunities. Illustratively anaerobic thermal dissociation of methane requires about 75 kJ/mole as shown by Equation 31.

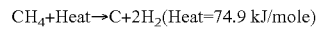
$$CH_4 + Heat \rightarrow C + 2H_2 (Heat = 74.9 \text{ kJ/mole}) \qquad \text{Equation 31}$$

Table 3 compares the approximate minimum thermal energy requirements for production of hydrogen by various approaches, one of which co-produces carbon (i.e. anaerobic thermal dissociation[1] of a hydrogen and carbon donor such as methane as shown in Table 3).

TABLE 3

ENERGY REQUIREMENT PER MOLE OF HYDROGEN

| RESOURCE | PROCESS | REACTION | THERMAL ENERGY REQUIREMENT |
|---|---|---|---|
| METHANE | DISSOCIATION[1] | $CH_4 \rightarrow C + 2H_2$ | 37.5 kJ/MOLE ($H_2$) 800-1000° C. |
| METHANE | STEAM REFORMATION | $CH_4 + 2H_2O \rightarrow CO_2 + 4H_2$ | 41.25 kJ/MOLE ($H_2$) 800-1000° C. |
| WATER | DISSOCIATION | $H_2O \rightarrow H_2 + .5O_2$ | 286 kJ/MOLE ($H_2$) 2800-3000° C. |
| WATER | ELECTROLYSIS[2] | $H_2O \rightarrow H_2 + .5O_2$ | 858 kJ/MOLE ($H_2$) @ POWER PLANT[2] |
| COAL | STEAM REFORMATION | $C + 2H_2O \rightarrow CO_2 + 2H_2$ | 45 kJ/MOLE ($H_2$) 1000-1500° C. |

[1] Anaerobic thermal dissociation of hydrocarbons efficiently produce carbon and hydrogen.
[2] Requires about 3 times more power plant combustion energy to make electricity required for electrolysis In addition to requiring the least amount of thermal energy per mole of hydrogen production, anaerobic dissociation of hydrocarbons such as methane can provide collection of carbon that may be utilized to make durable goods. It is highly desirable to produce hydrogen without releases of greenhouse gases such as $CO_2$ or carbonaceous particulates and to co-produce valuable carbon.

Previous thermal dissociation efforts however have been practiced as variously aerobic systems that wastefully burned the hydrogen to make carbon or burned the carbon to make hydrogen along with troublesome releases of greenhouse gases and particles. This has provided carbon black for purposes such as pigmentation, opacity, U.V. protection and as reinforcing filler in plastics and rubber products such as tires. In other instances it has provided hydrogen for chemical processes including production of ammonia and urea. However such wasteful processes have continued to be notorious sources of carcinogens, air and water pollution.

Various sources of heat and delivery systems are suitable for anaerobic dissociation of hydrocarbons such as concentrated solar energy, natural gas, propane, ethane or methane including systems with electric resistance elements, induction heating susceptors, and flame radiation and/or conduction from combustion of a suitable fuel. FIGS. 10A, 10B, 10C and 10D show selected portions of systems for production of adjustable ratios of electricity from a generator 1032 driven by engine 1030, fuel mixtures of hydrogen and other fuels such as CH4+H2 for unthrottled operation of such internal combustion engines, and liquid HCF blends that are produced from such mixtures or separated hydrogen with reactants such as nitrogen and/or an oxide of carbon.

Figure 10A:
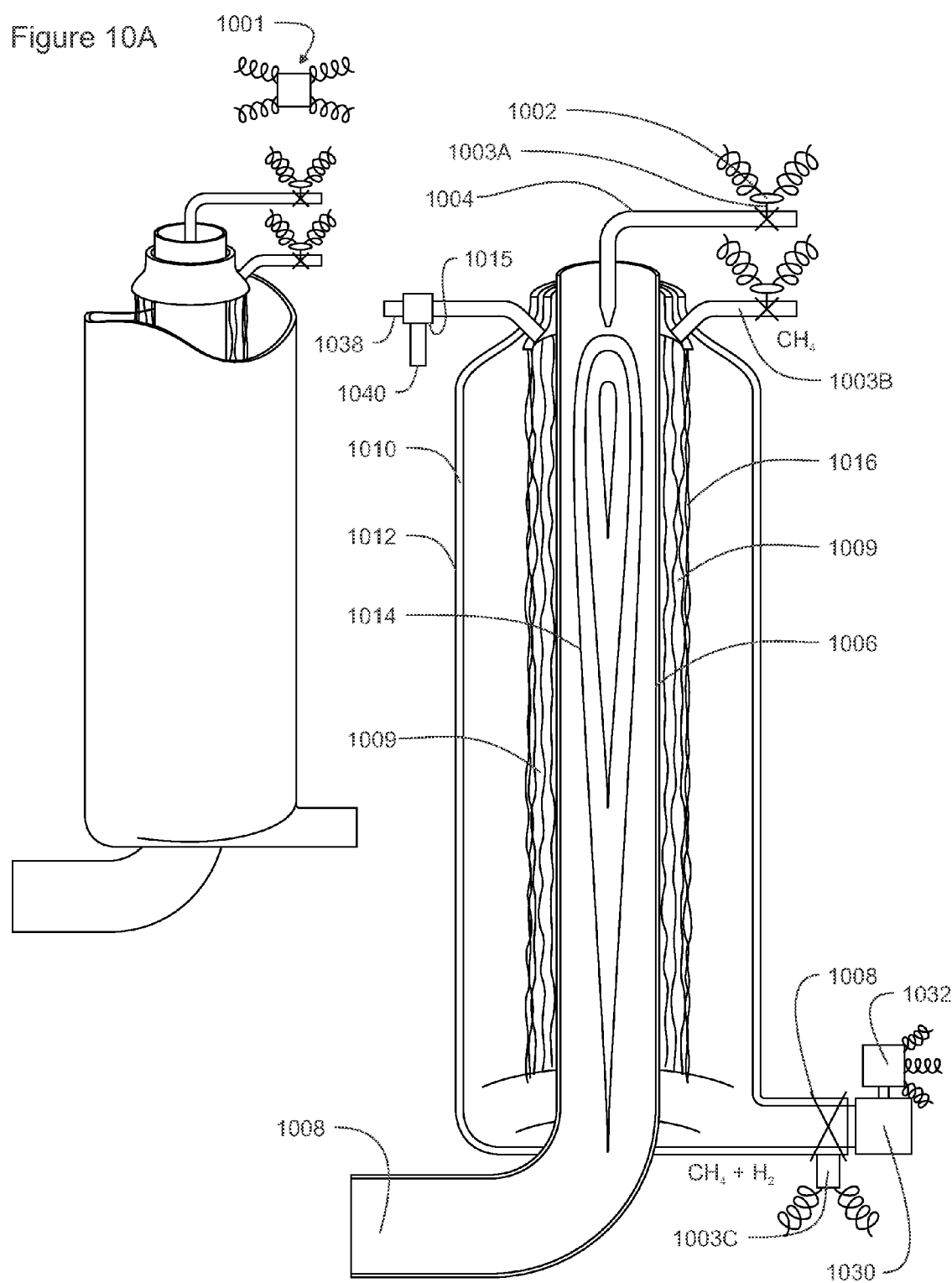
FIG. 10A illustrates a down draft burner according to a representative embodiment.
Figure 10B:
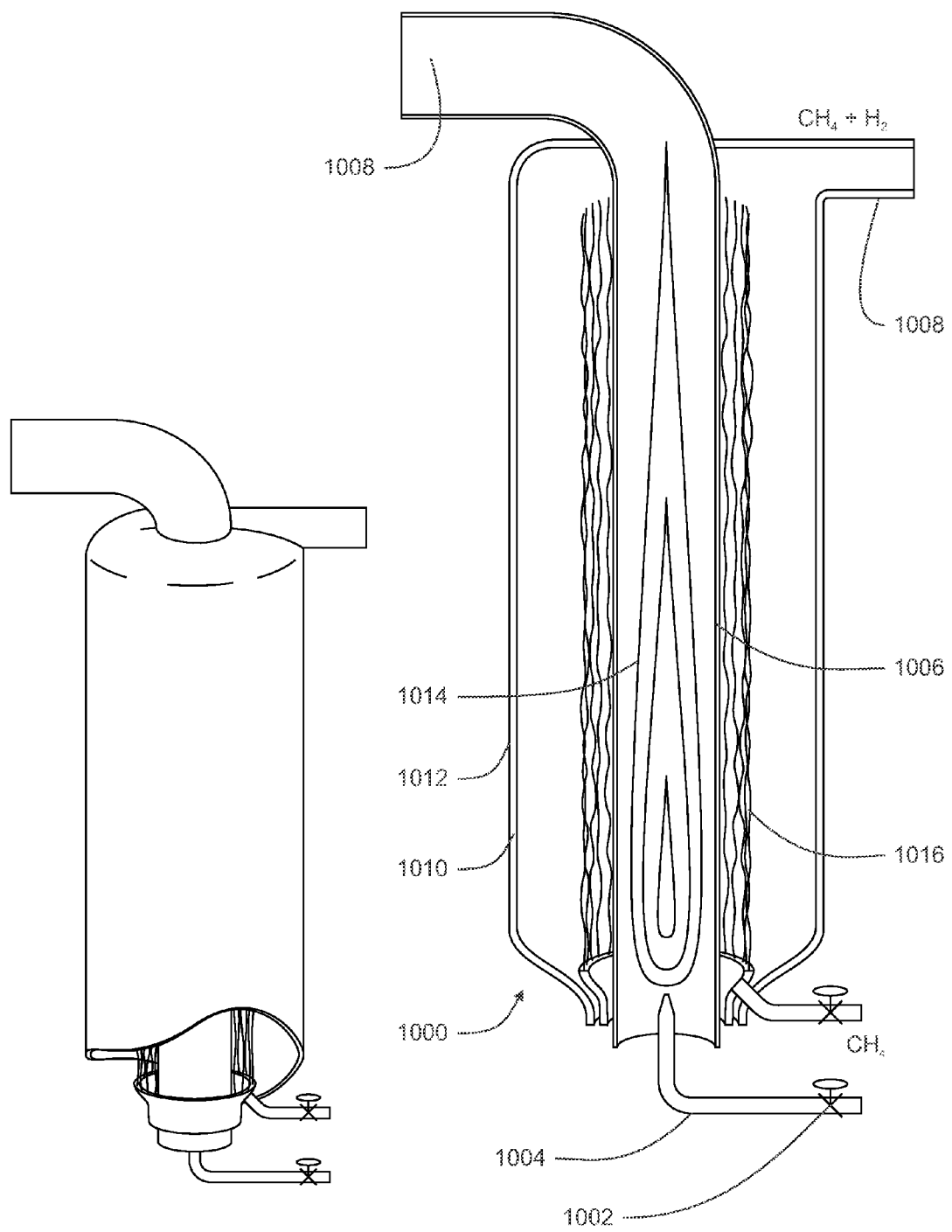
FIG. 10B illustrates an updraft burner according to a representative embodiment.
Figure 10C:
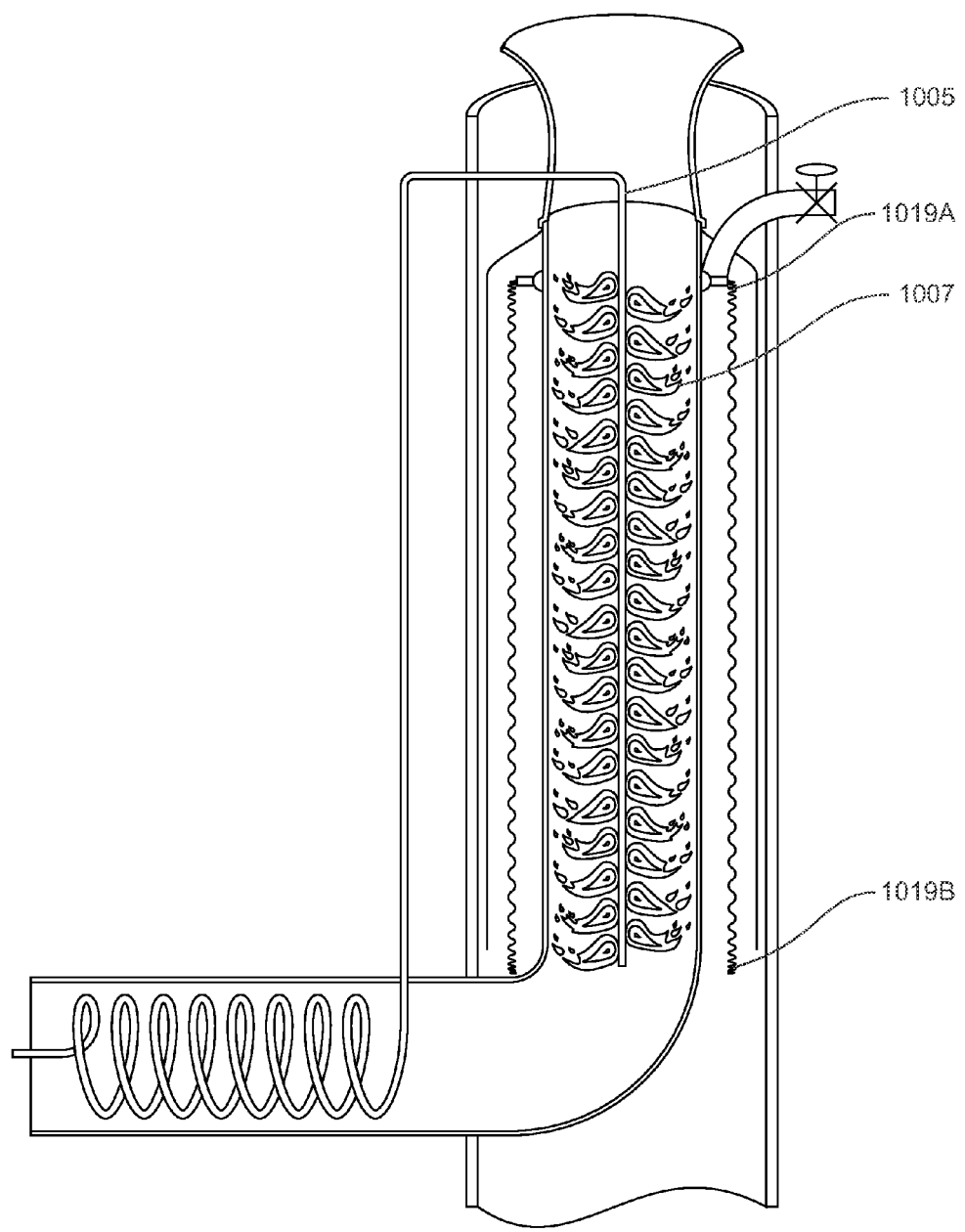
FIG. 10C illustrates a multi-orifice flame holder according to a representative embodiment.
Figure 10D:
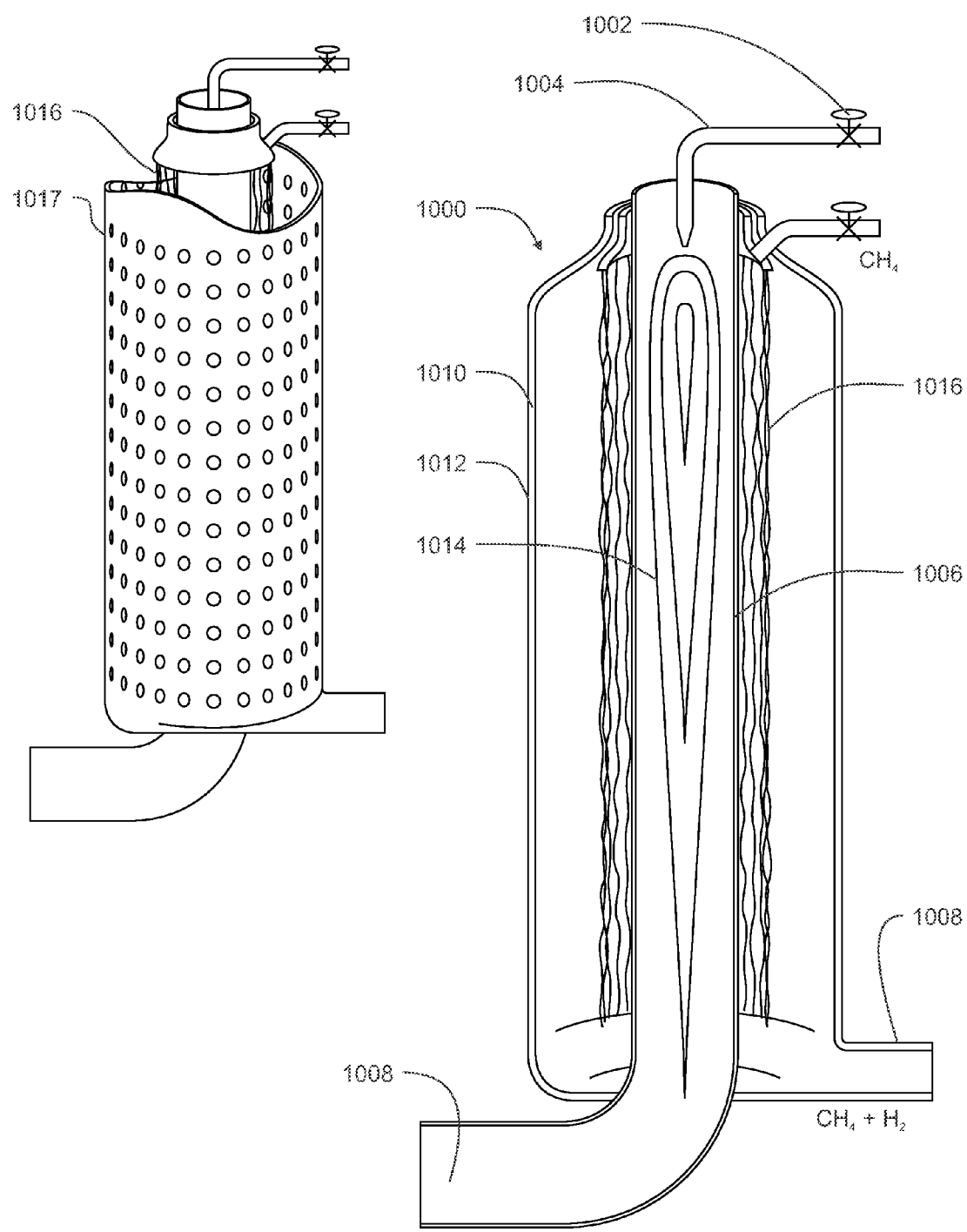
FIG. 10D illustrates a down draft burner according to another representative embodiment.

FIG. 10A schematically illustrates a system 1000 for producing a mixture of hydrogen and methane as carbon is collected on one or more suitable surface(s) or susceptors such as suspended or temporarily presented particles and/or other substrates such as heated filter curtain 1016. Suitable substrates include ceramic, glass, or carbon fibers including selections such as films, threads, bundled nanotubes or particles, yarn, cloth or refractory paper as a hydrocarbon such as methane flows through the hot zone of a reactor tube. Equation 32 qualitatively summarizes the process for a carbon and hydrogen donor such as methane in a representative non-stoichiometric reaction:

$$CH_4 + Heat \rightarrow C + CH_4 + H_2 \qquad \text{Equation 32}$$

In operation of a down draft burner (FIG. 10A) or an updraft burner (FIG. 10B) or a multi-orifice flame holder 1005 (FIG. 10C), a burner assembly 1004 or 1005 suitable for combustion of fuel such as methane and/or hydrogen produces flame 1014 or 1007 within a tube 1006. Fuel injected from the burner flame holder 1004 or 1005 mixes with oxidant such as air and combusts. Typical fuel selections are hydrocarbons such as methane and/or hydrogen. Such fuels and/or other carbon and hydrogen donors are illustratively represented as methane in many of the examples that follow.

Various concentrations such as about 5% to 45% hydrogen with methane overcomes requirements for premixing methane fuel and air along with enabling lower energy spark ignition and combustion is completed more rapidly in a wider range of fuel mixture ratios with air particularly including excess air. Tube 1006 may be made of an opaque high temperature material such as an opaque ceramic, stainless steel or super alloy or it may utilize a transparent ceramic material selection such as quartz, sapphire, or spinel.

In instances that it is made of an opaque material, tube 1006 is heated by flame 1014 and serves as a re-radiator to heat ceramic, glass, or carbon threads, nanotube or particles bundles, yarn, cloth, or refractory paper 1016 which then provides the heat source for anaerobic dissociation of methane that passes near or through such hot material. Certain embodiments provide suitably sized fins, cones, rods or textured surfaces on one or more surfaces of tube 1006 to improve conductive and/or radiative heat transfer.

In instances that tube 1006 is made of transparent material, radiant heat transfer from flame 1014 or 1005 may directly heat susceptors or materials including particles such as ceramics, iron oxide, or one or more allotropes of carbon that are suspended in methane and/or other selections such as filter curtain 1006 to provide dissociation of methane to deposit and/or trap carbon films, particles and/or filaments as hydrogen is released. In certain embodiments, one or more flame colorants or radiation emitter agents such as selected metal organics are added to the methane delivered to burner 1004 to improve the heat energy conversion efficiency and rate that methane chemical fuel potential energy is delivered radiatively to the carbon and hydrogen donor substance and/or the collection curtain.

Controller 1001 monitors sensors 1009 that measure the temperatures of deposition substrates such as filter curtain 1016 to adaptively adjust the rate methane is added to the dissociation process chamber 1010 in correspondence with the rate that heat is provided according to the rate that fuel is combusted within tube 1006 to produce the desired rate of carbon collection and consequently the ratio of hydrogen to methane mixture delivered through port 1018 to an application such as a piston engine and/or liquid HCF synthesizer. Occasionally methane delivered through valves 1003A and/or 1003B is shut off and a non-oxidizing gas such nitrogen, argon, or helium is added through conduit 1040 and three-way valve 1015 to purge away remaining methane and hydrogen within tube 1010 to provide for removal of carbon collected on filter curtain 1016 or 1116 by a suitable vacuum cleaner, shaker, combs, reverse roller and/or buncher system.

In certain embodiments, filter curtain material is fed from folded, rolled or bunched storage 1019A through the heated zone to receive dissociated carbon as the process system folds, rolls or bunches 1019B carbon loaded material. In some embodiments after filter curtain 1016 is loaded with carbon it is utilized in part or in a suitably modified form as an activated filter media or as one or more components of renewable energy harvesting equipment such as solar roofing or SOTEC systems as disclosed in U.S. patent application Ser. No. 13/584,773, filed Aug. 13, 2012 and Ser. No. 13/764,141, filed Feb. 11, 2013, the disclosures of which are incorporated herein by reference in their entireties.

In certain embodiments, carbon is produced by chemical vapor deposition (CVD) and/or physical vapor depiction (PVD) in which corona, plasma or microwave induced anaerobic dissociation of methane and deposited on a rotating drum 1011 that may be placed near to or that replaces all or selected portions of collector curtain 1016. Drum 1011 may be made of a material conducive to deposition of graphene such as copper, iron, cobalt or nickel or oxidized surfaces of such metals. Drum 1011 may have surface patterns of suitably dimensioned and spaced lines and/or dots of one or more selections of such materials to stimulate carbon deposition and subsequent removal that is favorably induced because of release stresses that are developed due to thermal expansion/contraction loading of the deposited carbon film.

In some embodiments, selected allotropes of carbon and/or carbides or other ceramic particles are occasionally added to the carbon deposition zone through valve 1015 along with the flow of a gas such as methane, nitrogen or argon. Such particles are rapidly heated by radiation from flames 1007 or 1014 and/or from filter curtain fibers 1009 or 1116 and grow as carbon is deposited. In some instances filter curtain 1009 or 1116 includes fibers that mechanically trap but are not bonded to such particles and thus allow the particles to grow and be separated by vibration, reverse rolling or bunching, or otherwise mechanically separating the fibers such as by combs.

A suitable mixture of hydrogen and methane produced by reactor 1000 is directly injected and ignited in unthrottled air to fuel power an electricity generator such as a gas turbine, fuel cell or piston engine driven generator 1030-1032. The same or an adjusted mixture of hydrogen and methane or hydrogen that is selectively removed and/or pressurized by electrode membrane assembly 258 or 860 is reacted with carbon dioxide and/or nitrogen to produce net hydrogen liquid fuels such as fuel alcohols, fuel acids i.e. formic, butyric, or acetic acid, or nitrogenous compounds such as ammonia or urea as shown by Equations 33-41. Carbon dioxide, carbon monoxide, and/or nitrogen that may be preemptively collected from the exhaust stacks of power plants, bakeries, breweries, calciners, ethanol plants, refineries, coke converters, aerobic or anaerobic digesters (or from the atmosphere) are utilized in reactions with gases separated by the process of Equation 32 to produce net-hydrogen liquids such as noted in Equations 33-39.

$$3H_2+N_2 \rightarrow 2NH_3 \quad \text{Equation 33}$$

$$3H_2+CO_2+N_2 \rightarrow CH_4ON_2+H_2O \quad \text{Equation 34}$$

$$H_2+CO_2+2CH_4 \rightarrow C_2H_5OH+CH_3OH \quad \text{Equation 35}$$

$$2H_2+CO_2+CH_4 \rightarrow 2CH_3OH \quad \text{Equation 36}$$

$$H_2+CO_2 \rightarrow HCOOH \quad \text{Equation 37}$$

$$3H_2+CO_2 \rightarrow CH_3OH+H_2O \quad \text{Equation 38}$$

In instances that it is desirable to convert carbon dioxide to carbon monoxide the process of Equation 39 may utilize a carbon donor such as some of the carbon or methane noted in Equation 32 to co-produce hydrogen and carbon monoxide.

$$CH_4+CO_2 \rightarrow 2CO+2H_2 \quad \text{Equation 39}$$

The ratio of hydrogen and carbon monoxide can be adjusted as may be the reaction temperature, pressure and/or catalyst selection to produce hydrogen carrier fuel (HCF) liquids such as wet or dry fuel alcohols as summarized by Equations 40 and 41.

$$2H_2+CO \rightarrow CH_3OH \quad \text{Equation 40}$$

$$4H_2+2CO \rightarrow C_2H_5OH+H_2O \quad \text{Equation 41}$$

Similarly the ratio of hydrogen and nitrogen and/or carbon monoxide can be adjusted as may be the reaction temperature, pressures and/or catalyst selections to produce HCF liquids such as nitrogenous compounds and solutions as summarized by Equations 42, 43 and 44

$$2H_2+N_2+CO \rightarrow CH_4N_2O \quad \text{Equation 42}$$

$$6H_2+3CO+N_2 \rightarrow C_2H_5OH+CH_4N_2O+H_2O \quad \text{Equation 43}$$

$$2NH_3+CO_2 \rightarrow H_2N-COONH_4 \quad \text{Equation 44}$$

Nitrogenous preparations such as urea may be utilized to store hydrogen densely as a dry, odorless, non-poisonous solid with virtually limitless shelf life. In granular form it may be poured, transferred or dispensed. Such solids are soluble in water and many fuels such as alcohols to readily form liquid HCF selections with customized vapor pressure and other properties.

This facilitates preparation of liquid HCF fuels for transport by existing pipelines and repurposed tanks designed for gasoline, diesel and jet fuels. The net-hydrogen HCF liquids that are produced can store hydrogen more densely than cryogenic liquid hydrogen and upon use in a fuel cell or heat engine reduce or eliminate net production of greenhouse gases. Illustratively economic development opportunities are provided for hydrocarbons (i.e. methane, ethane etc.,) that are ordinarily released from substances that rot or burn. Each ton of carbon that is collected by the dissociation of carbon and hydrogen donor avoids about 3.67 tons of $CO_2$ that would be released into the atmosphere upon eventual oxidation after decades of hydrocarbon harm to the global atmosphere.

Similarly much less water vapor is released to the atmosphere upon combustion of such net hydrogen liquid fuels compared to combustion of fossil fuels to produce as much heat. Illustratively, each ton of hydrogen in a fossil fuel releases nine tons of water vapor in addition to the ambient moisture or humidity. Crop residue or organic waste sourced hydrogen that is incorporated in a net-hydrogen liquid fuel or hydrogen carrier fuel (HCF) release only as much water as the amount previously used by the green plants that sourced such wastes. In instances that organic wastes source hydrogen that is utilized to produce a durable good such as a thermoset or thermoplastic polymer the surface inventory of available water is actually reduced.

Combustion of fossil fuels in central power plants in the U.S. release more than 1.7 billion tons or "1.7 BTons" of $CO_2$ each year into the atmosphere, which is about 38% of the U.S. total. Transportation engines produce about 32%. Preemptive collection of about 60% of such carbon dioxide from power plant stacks for production by the process of Equation 45 of net hydrogen liquid or HCF such as methanol provides fuel that can be stored in repurposed gasoline and diesel fuel tanks.

$$2H_2 + CO_2 + CH_4 \rightarrow 2CH_3OH \quad \text{Equation 45}$$

$$4BTH_2 + 44BTCO_2 + 16BCH_4 \rightarrow 64\ BT\ CH_3OH \quad \text{Equation 46}$$

And such utilization of 59 or 60% of 1.7 BTons is about 1 BTons, thus: 1 BTons $$CO_2 + 0.09BTons\ H_2 + 0.36BTons\ CH_4 \rightarrow 1.45\ BTons\ CH_3OH \quad \text{Equation 47}$$

Methanol weighs about 6.63 pounds/gallon, therefore 1.45 BTons would be equivalent to about 437 billion gallons of HCF. Methanol provides about 50% of the heating value of petrol liquids and thus about two times as many gallons as the 220 billion gallons of liquid fossil fuels now burned annually in the U.S.

An embodiment for serving existing U.S. electricity markets provides capacity of about 4,200,000,000 Megawatt hours per year by about 20,000,000 recycled engines that are converted to net hydrogen operation to power electricity generators (4,200,000,000, MegaWattHours) (25,000 W)(8,760 hrs/year) equals 19.2 million gensets). Production of electricity at an average of about 25 KW per engine-generator set would supply the U.S. market. Twenty million recycled engines represent less than 8% of the registered engine-powered vehicles operating in the U.S. Engines could be recycled at the rate of 1 or 2% of U.S. fleet per year to double the U.S. energy utilization efficiency and supply the U.S. electricity capacity in less than 10 years and do so with far greater national energy security and less infrastructure maintenance including power grid systems now needing improvements.

Similar analysis for production of carbon and HCF for regions such as China, India, Korea, Japan, Russia, Europe, North America, and South America provide the opportunity for sustainable economic development and for overcoming damages due to global warming and climate changes.

Figure 11A:
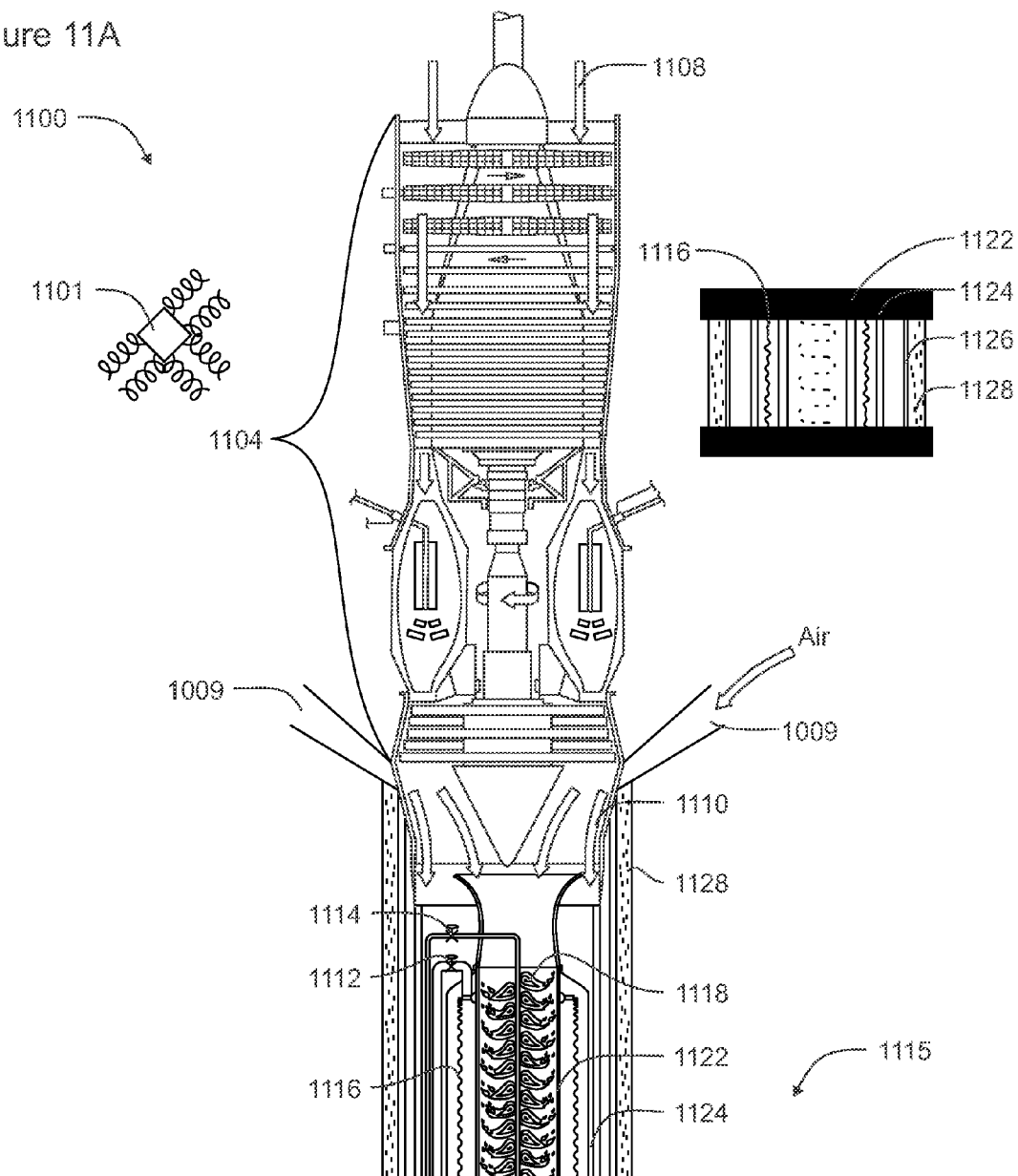

In other embodiments such as shown in FIGS. 11A-D repurposed gas turbine engines are converted for sourcing heat and/or $CO_2$ and/or $N_2$ for operation on hydrogen or hydrogen-characterized fuel. Gas turbine exhaust temperatures are generally higher than from piston engines. FIGS. 11A, 11B, 11C and 11D show selected portions of systems for production of adjustable ratios of electricity from generator 1102 driven by gas turbine 1104, fuel mixtures of hydrogen and other fuels such as $CH_4 + H_2$ for unthrottled operation of internal combustion engines, and liquid HCF blends that are produced from such mixtures or separated hydrogen with reactants such as nitrogen and/or an oxide of carbon. Higher gas turbine exhaust gas temperatures along with adaptively adjusted excess air content as may be provided at entryways 1108 and/or 1109 provide improved carbon and hydrogen production efficiency in embodiment 1100 as shown in FIG. 11A for a down draft system and in FIG. 11D for an updraft system and in FIG. 11C for a horizontal axis system. Hot gas turbine exhaust gases 1110 including adaptively adjusted air 1009 such as excess air enters the carbon collection and hydrogen production system 1115.

Suitable selections of gas turbines for the present repurposing purposes include inexpensive, less efficient types that provide relatively high exhaust temperatures. Accordingly a relatively low capital cost for such equipment along with advantageous exhaust temperature provides lower cost production of carbon, hydrogen and/or liquid fuel HCF along with shaft power and/or air compression production. Illustratively in instances that large scale production of air conditioning, electricity and/or HFC is needed it is advantageous to utilize larger gas turbines in such combined purpose systems.

Figure 11B:
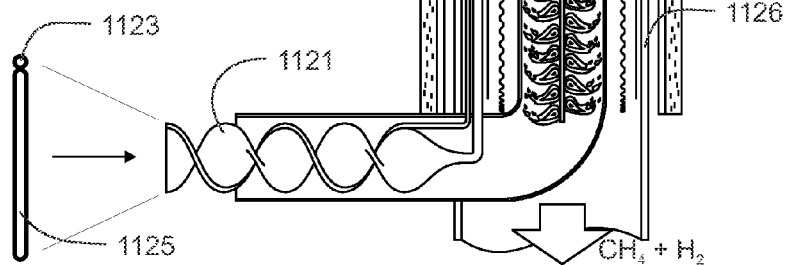
Figure 11D:
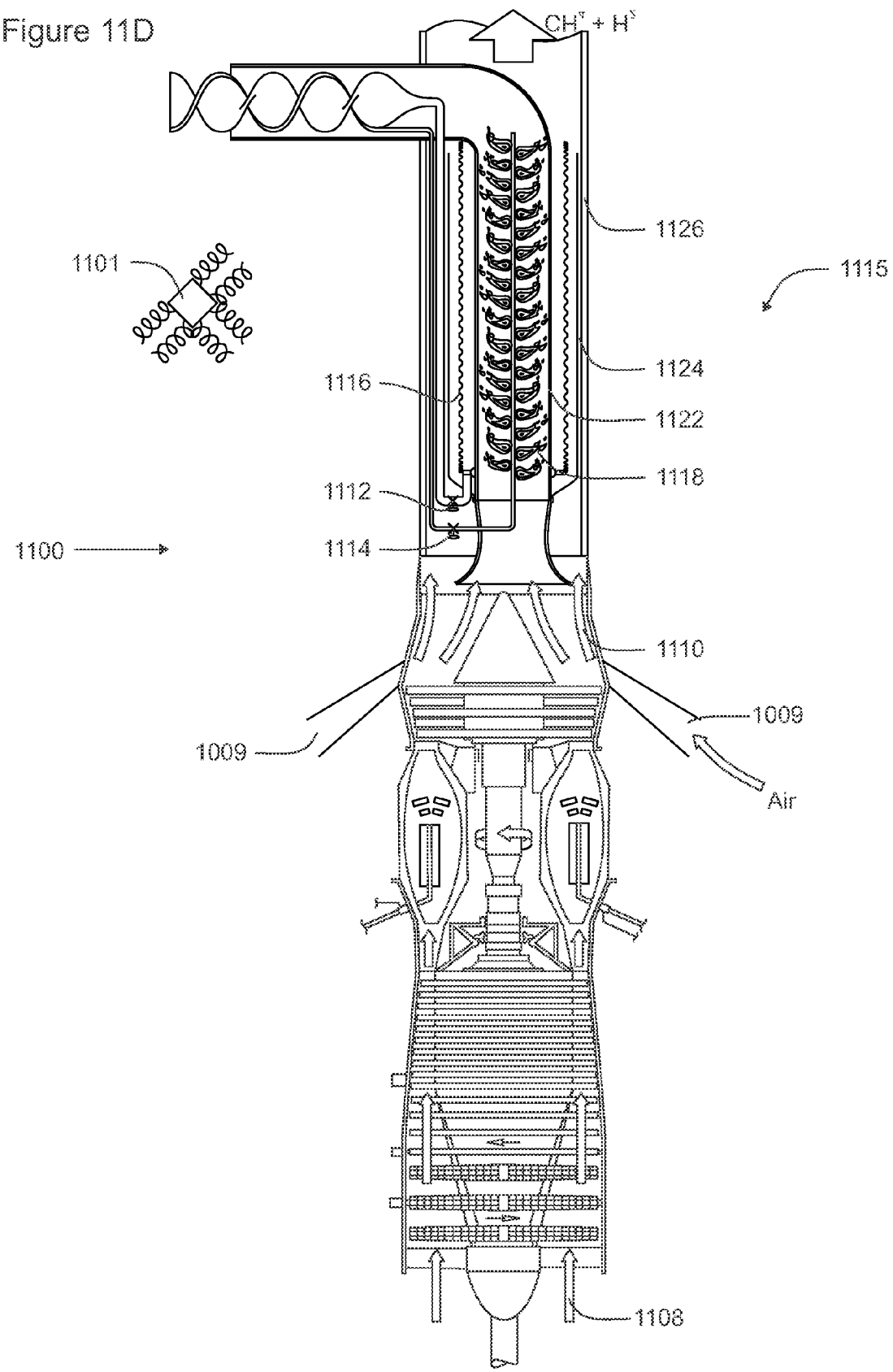

In some embodiments, fuel for combustion is preheated heated by countercurrent heat exchanger 1121, which is a fin-tube with two or more passage ways including 1123 for fuel and 1125 for carbon and hydrogen donor substances. FIG. 11B shows a cross section view of a simplified version of twisted fin-tube 1121 with passageways 1123 and 1125 for continuously providing heat transfers from hot combustion gases to preheat fuel (e.g. in passageway 1123) along with carbon and hydrogen donor substances (e.g. in passageway 1125). Such fin tubes may also be corrugated, textured, and/or knurled to provide greater surface to volume ratios on the inside or outside surfaces and/or micro-channels in selected zones. This provides energy saving heat collection from combustion gases 1118 traveling from tube 1122. Heat transfer tubing such as 1121 may also be utilized to transfer heat from mixtures of hydrogen and feed stock such as methane to feed stock and/or oxidant such as air that is combusted in the system. This provides one of the ways that the temperature of nitrogen, oxygen, carbon dioxide and/or water vapor may be adjusted for further utilization in synergistic applications such as production of components of HCF blends.

Controller 1101 adaptively adjusts or interrupts flow of fuel to combustor 1118 and/or to the carbon collection and hydrogen production chamber 1124. Combustion containment tube 1122 may be made of opaque or transparent materials as previously disclosed. Surplus hot exhaust gas may be routed between collection chamber 1124 and shroud 1126 which may be insulated 128 by ceramic compositions, refractory wool and/or multiple reflective foils.

Heat provided from engine coolant (H-1), exhaust gas transfers (H-2), along with controlled fuel combustion (H-4) using preheated air and/or hot exhaust gases with surplus oxidant will produce carbon and hydrogen by reactions such as shown in Equations 1 and 2. Such synergistic utilization of engine waste heat to preheat oxidant and/or fuel improves the overall process efficiency to provide more carbon and hydrogen per fuel unit consumed. Liquid net hydrogen HCFs will be produced according to reactions typical to Equations 33-41 using carbon dioxide from the atmosphere and/or prioritization of preemptive collections from concentrated sources such as power plants, bakeries, breweries, calciners, and waste digestion plants. Supplemental energy produced by carbon-reinforced equipment that harnesses solar, wind, moving water, geothermal and other renewable resources can be utilized for increased rates of carbon and hydrogen production to meet market demands for less expensive net hydrogen HCF and carbon products that result in higher performance durable goods.

Figure 12:
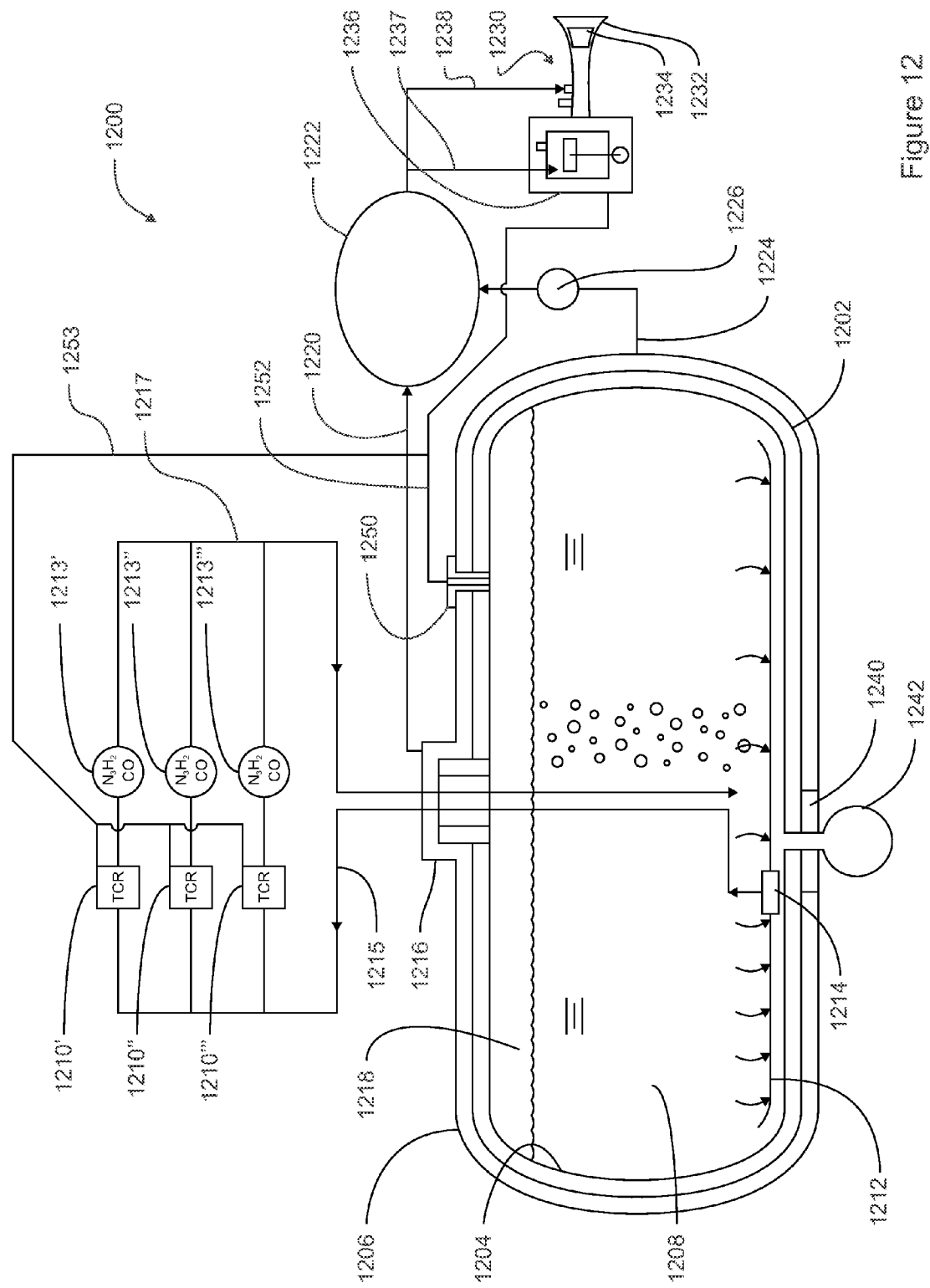
FIG. 12 is a side view in partial cross-section of a retrofit fuel tank according to a representative embodiment.

FIG. 12 illustrates a fuel storage system 1200 that includes an existing petrol fuel tank 1202 that has been converted for use with net-hydrogen carrier fuels. The existing fuel tank 1202 can be any suitable self-supporting shell manufactured from any suitable material such as aluminum, steel, plastic, or other suitable tank material. For example, suitable tanks for conversion include diesel, gasoline, propane, compressed natural gas (CNG), water, or any other suitable container. Furthermore, the technology disclosed herein can be applied to any suitably sized tank. The existing fuel tank 1202 is converted by lining it with a fluid-tight inner layer 1204 and covering it on the outside by a fluid-tight outer layer 1206. The inner layer 1204 can be in the form of an inner liner or bladder that is formed from any suitable chemically inert material, such as EPDM, thin rubber, or the like. In some embodiments, the inner liner is attachable with adhesive to an inner surface of the existing fuel tank 1202. In other embodiments, the inner liner contracts as fuel is used in an accordion like manner, for example. The outer layer can be comprised of any suitable chemically inert, UV stable material, such as vinyl fluoride, polyvinyl fluoride, fluoroelastomer (e.g., Viton®), and the like.

The converted fuel tank 1202 can contain any suitable net hydrogen carrier fuel 1208, such as $NH_3$, Wet Black Alcohol, DME, DEE or the like. The net hydrogen fuels can be made from hydrogen combined with N or $CO_2$ that is extracted from the atmosphere or any suitable source such as a digester or hot/cold anaerobic process, for example. The fuel 1208 is transported in liquid state to TCR processors 1210', 1210", and 1210" via a fuel pick up conduit 1212. Conduit 1212 can include a suitable filter 1214. Conduit 1215 is connected to conduit 1212 and extends through fuel cap 1216 and connects to the TCR processors 1210', 1210", and 1210'''. A return line 1217 extends between TCR processors 1210', 1210", and 1210" and fuel cap 1216 and provides a passageway for cover gas 1218 to be returned to the tank 1202. The cover gas can be any suitable gas such as $CO_2$, CO, or N for example.

The TCR processors 1210', 1210", and 1210''' provide separation and pressurization of the hydrogen and carbon monoxide fuel constituents as well as nitrogenous feed stocks at 1213', 1213", and 1213'''. The TCR processors use low-grade heat and/or complementary regenerative energy harvested from engine 1230 via conduits 1252 and 1253. In some embodiments, the waste heat from the engine 1230 can directly pressurize the tank 1202 via conduit 1252 and pressure port 1250. Having three TCR processors in parallel allows the system to constantly pressurize the tank 1202. Although the fuel storage system 1200 includes three TCR circuits, more or fewer TCR circuits can be used.

Excess gas emitted from tank 1202 via cap 1216 is conveyed through vent 1220 to a carbon canister 1222 that absorbs the fumes. Any gas or liquid leaking past inner layer 1204 is captured within outer layer 1206 and fed to the carbon canister 1222 through conduit 1224. In some embodiments, a leak flow sensor 1226 is positioned along conduit 1224 to detect and monitor leakage. Excess gas accumulated in canister 1222 is fed to engine 1230. In some embodiments, the excess gas is fed into combustion chamber 1236 via conduit 1237. In other embodiments, the excess gas is fed into turbine 1234 located in exhaust 1232 via conduit 1238. Therefore, the excess gas is converted to energy output when burned in the combustion chamber 1236 or by the turbine 1234. In some embodiments, the carbon canister 1222 includes a flow-through path for rapid vapor dump (e.g., explosion).

In various embodiments, system 1200 also includes a tattletale sensor 1242 positioned on the bottom of tank 1202. Sensor 1242 extends through the outer layer 1206, fuel tank 1202, and inner liner 1204. Sensor 1242 is sealed and attached to the tank by a patch 1240. Patch 1240 can be any suitable material such as fiber and may be combined with a thermoset adhesive matrix.

Advantages of the above described systems include using repurposed tanks uses less energy and materials than a new tank. Existing tanks are readily and quickly available. No catalyst or rare materials are needed. These retrofit tanks are safer than diesel or gasoline tanks. For example, the hydrogen is in the form of alcohol or gas that quickly escapes. Water can be present in the tank without interfering with combustion because the fuel and water goes through the TCR process before combustion. Water also reduces the toxicity of alcohol based fuels.

It should be understood that the conversion of a fuel tank may be effected by a fuel tank conversion kit including one or more of the above described components. For example, a representative conversion kit can include a flexible fluid-tight inner liner positionable within an existing fuel tank adjacent to an inward facing surface of the existing fuel tank. In some embodiments, the kit can include a fluid-tight outer layer positionable adjacent to an outward facing surface of the existing fuel tank. In some embodiments, the fluid-tight inner liner and the fluid-tight outer layer are comprised of polymer. In some embodiments, the inner liner is attachable to the inside of the existing fuel tank. In other embodiments, kits can also include a net-hydrogen carrier fuel pickup conduit positionable inside the flexible fluid-tight inner liner. In some embodiments, the kit further comprises a vent extendable through the fluid-tight inner liner, the fluid-tight outer layer, and the existing fuel tank. In some embodiments, the kit further comprises a gas collection canister that is connectable to an engine and includes a carbon element.

It should also be appreciated that methods for converting an existing fuel tank for use with net-hydrogen carrier fuels are disclosed herein. For example, in a representative embodiment, the method comprises lining an inside surface of an existing fuel tank with a chemically inert liner and covering an outside surface of the existing fuel tank with a fluid-tight outer layer. In some embodiments, the method can include installing a fuel pickup conduit inside the chemically inert liner. In other embodiments, the method can include attaching (e.g., with adhesive) the chemically inert liner to the inside surface of the existing fuel tank.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A fuel tank, comprising:
   a self-supporting shell having an inward facing surface and an outward facing surface;
   an inner layer disposed adjacent the inward facing surface, the inner layer comprises a conformable liner;
   a fluid-tight outer layer disposed adjacent the outward facing surface, the outer layer encasing the self-supporting shell, whereby the outer layer captures fluid exiting from the self-supporting shell; and
   a fill port extending through the self-supporting shell, the inner layer, and the fluid-tight outer layer.

2. The fuel tank according to claim 1, further comprising a vent extending through the inner layer, the fluid-tight outer layer, and the self-supporting shell, whereby the vent conveys the captured fluid to a gas collection canister.

3. The fuel tank according to claim 2, wherein the gas collection canister is in fluid communication with the fluid-tight outer layer to transport excess gas to an engine or a turbine.

4. The fuel tank according to claim 2, wherein the gas collection canister comprises a carbon element.

5. The fuel tank according to claim 1, wherein the fill port comprises an opening to receive the inner layer to be erected in the fuel tank to conform to the inward facing surface of the fuel tank.

6. The fuel tank according to claim 1, further comprising a sensor connected to the self-supporting shell and positioned to detect exited fluid from the self-supporting shell and captured by the fluid-tight outer layer.

7. The fuel tank according to claim 1, wherein the inner layer is attached to the self-supporting shell.

8. The fuel tank according to claim 1, wherein the inner layer is not attached to the self-supporting shell.

9. The fuel tank according to claim 1, wherein the inner layer comprises a fluid escapable material.

10. A container conversion kit for converting an existing container for use with net-hydrogen carrier fuels, the container conversion kit comprising:
    a flexible inner liner positionable within an existing container adjacent to an inward facing surface of the existing container, the flexible inner layer comprises a conformable balloon-like bladder;
    a fluid-tight outer layer positionable adjacent to an outward facing surface of the existing container, the outer layer encasing the existing container, the fluid-tight outer layer captures fluid leaked from the container or the inner layer;
    a fill port extending through the existing container, the flexible inner liner, and the fluid-tight outer layer, said fill port comprising an opening to receive the flexible inner liner; and
    a net-hydrogen carrier fuel pickup conduit positionable inside the flexible inner liner.

11. The container conversion kit according to claim 10, further comprising a gas collection canister.

12. The container conversion kit according to claim 11, further comprising a vent extendable through the inner liner, the fluid-tight outer layer, and the existing fuel tank, whereby the vent conveys the captured fluid to the gas collection canister.

13. The container conversion kit according to claim 11, wherein the gas collection canister is connectable to an engine.

14. The container conversion kit according to claim 11, wherein the gas collection canister comprises a carbon element.

15. The container conversion kit according to claim 10, wherein an exterior surface of the inner liner is coated with an adhesive and is attachable in response to pressurized contact to the existing container.

16. The container conversion kit according to claim 10, wherein the existing container is a fuel tank.

17. A container conversion kit for converting an existing container for use with net-hydrogen carrier fuels, the container conversion kit comprising:
    a flexible inner liner positionable within an existing container adjacent to an inward facing surface of the existing container;
    a net-hydrogen carrier fuel pickup conduit positionable inside the flexible inner liner;
    a fluid-tight outer layer positionable adjacent to an outward facing surface of the existing container, the fluid-tight outer layer encasing the existing container and capturing fluid exiting from the existing container; and
    a thermo-chemical regeneration processor being in fuel communication with the net-hydrogen carrier fuel pickup conduit.

18. The container conversion kit according to claim 17, further comprising a pressure port connectable to an engine and extendable through the fluid-tight inner liner and the existing container.

19. The container conversion kit according to claim 17, further comprising a conduit connectable between an engine and the thermo-chemical regeneration processor.

20. The container conversion kit according to claim 17, further comprising a vent extendable through the flexible inner liner, the fluid-tight outer layer, and the existing container, whereby the vent conveys the captured fluid to a gas collection canister.

21. A method for converting an existing fuel tank for use with net-hydrogen carrier fuels, the method comprising:
    inserting a chemically inert liner of the existing fuel tank such that the chemically inert liner is positioned adjacent an inner surface of the existing fuel tank;
    erecting the chemically inert liner to conform to the inside surface of the existing fuel tank;
    covering an outside surface of the existing fuel tank with a fluid-tight outer layer for capturing fluid exiting from the existing fuel tank;
    attaching the chemically inert liner to the inside surface of the existing fuel tank; and
    installing a fuel pickup conduit inside the chemically inert liner.

22. The method according to claim 21, wherein inserting the chemically inert liner through an opening of a fill port, the fill port extending through the existing fuel tank, the chemically inert liner, and the fluid-tight outer layer.

23. The method according to claim 21, wherein attaching the chemically inert liner comprises attaching the chemically inert liner in response to a pressurized contact against the existing fuel tank.

24. The method according to claim 21, wherein attaching the chemically inert liner comprises attaching the chemically inert liner to the inside surface of the existing tank with an adhesive.

25. The method according to claim 21, further comprising conveying the captured fluid to a gas collection canister.

* * * * *